(12) United States Patent
Stewart

(10) Patent No.: US 9,750,229 B2
(45) Date of Patent: Sep. 5, 2017

(54) IN-HOME PET FEEDING AND MONITORING SYSTEM

(71) Applicant: PetTrax, Inc., Stoughton, MA (US)

(72) Inventor: William Stewart, Stoughton, MA (US)

(73) Assignee: PETTRAX, INC., Stoughton, MA (US)

( * ) Notice: Subject to any disclaimer, the term of this patent is extended or adjusted under 35 U.S.C. 154(b) by 136 days.

(21) Appl. No.: 14/725,646

(22) Filed: May 29, 2015

(65) Prior Publication Data

US 2015/0342143 A1     Dec. 3, 2015

Related U.S. Application Data

(60) Provisional application No. 62/004,270, filed on May 29, 2014, provisional application No. 62/039,951, filed on Aug. 21, 2014.

(51) Int. Cl.
*A01K 1/10*     (2006.01)
*A01K 5/02*     (2006.01)
*A01K 29/00*    (2006.01)

(52) U.S. Cl.
CPC .......... *A01K 5/0283* (2013.01); *A01K 5/0275* (2013.01); *A01K 29/00* (2013.01)

(58) Field of Classification Search
CPC ............................ A01K 5/0286; A01K 5/0291
See application file for complete search history.

(56) References Cited

U.S. PATENT DOCUMENTS

| 361,621 | A | 4/1887 | Ferguson |
| 713,743 | A | 11/1902 | McHenry |
| 3,204,608 | A | 9/1965 | Snitz |
| D207,166 | S | 3/1967 | Noble |
| 3,340,851 | A | 9/1967 | Frank |
| 3,720,184 | A | 3/1973 | Pearce |
| 3,730,141 | A | 5/1973 | Manning et al. |
| 3,985,104 | A * | 10/1976 | Klemer ............... A01K 5/0291 119/51.12 |
| 4,034,715 | A | 7/1977 | Arner |
| 4,079,699 | A | 3/1978 | Longmore et al. |

(Continued)

FOREIGN PATENT DOCUMENTS

AU     2008364333 A1     5/2010

OTHER PUBLICATIONS

International Search Report and Written Opinion issued in PCT/US15/33243, dated Aug. 21, 2015 (10 pages).

*Primary Examiner* — Kristen C Hayes
(74) *Attorney, Agent, or Firm* — Wilmer Cutler Pickering Hale and Dorr LLP

(57) ABSTRACT

Pets require regular and controlled amounts of food and water for their best health. A single entry feeding zone ensures that only one pet can feed at a time. The single entry feeding zone contains a food bowl into which food may be dispensed. A sensor determines which pet is currently present and denies access to food if no authorized pet is present. A detection mechanism determines the amount of food each identified pet has consumed in order to manage pet diet and denies access to food if the pet has consumed the allotted amount of food. Network functionality provides remote data tracking, correlates pet feeding behavior across multiple feeders if present, and allows a pet owner to remotely adjust parameters of the feeder or view the pet through a camera.

9 Claims, 27 Drawing Sheets

(56) References Cited

U.S. PATENT DOCUMENTS

| | | | | |
|---|---|---|---|---|
| 4,256,054 | A | 3/1981 | Hitchcock | |
| D259,068 | S | 4/1981 | Barkman | |
| 4,279,221 | A | 7/1981 | Arvizu | |
| 4,303,039 | A | 12/1981 | Thibault | |
| D278,169 | S | 3/1985 | Cargile, Jr. | |
| 4,688,520 | A | 8/1987 | Parks | |
| 4,721,063 | A | 1/1988 | Atchley | |
| 4,722,300 | A | 2/1988 | Walker et al. | |
| 4,733,634 | A | 3/1988 | Hooser | |
| 4,735,171 | A | 4/1988 | Essex | |
| 4,932,361 | A | 6/1990 | Deutsch et al. | |
| 4,947,796 | A | 8/1990 | Robinette | |
| 5,016,572 | A | 5/1991 | Weber et al. | |
| D335,939 | S | 5/1993 | Cooper | |
| 5,299,529 | A * | 4/1994 | Ramirez | A01K 5/0291 119/51.11 |
| D350,841 | S | 9/1994 | VanSkiver | |
| 5,351,649 | A | 10/1994 | Rovira Badia et al. | |
| 5,433,171 | A | 7/1995 | Ewell | |
| D364,942 | S | 12/1995 | VanSkiver et al. | |
| 5,669,328 | A * | 9/1997 | Lanfranchi | A01K 5/02 119/51.12 |
| 5,673,811 | A | 10/1997 | Dickinson et al. | |
| 5,794,560 | A | 8/1998 | Terenzi | |
| 5,794,565 | A | 8/1998 | Beshah | |
| D405,560 | S | 2/1999 | Chrisco | |
| 6,044,795 | A | 4/2000 | Matsuura et al. | |
| 6,135,056 | A | 10/2000 | Kuo | |
| 6,142,099 | A | 11/2000 | Lange, Jr. | |
| 6,145,472 | A * | 11/2000 | Vittuari | A01K 5/0291 119/51.02 |
| 6,196,158 | B1 | 3/2001 | Yang | |
| 6,227,143 | B1 | 5/2001 | Papkov | |
| 6,247,628 | B1 | 6/2001 | Sato et al. | |
| 6,487,987 | B1 * | 12/2002 | Choi | A01K 5/0291 119/51.11 |
| 6,681,718 | B1 | 1/2004 | McIlarky | |
| 6,701,866 | B1 | 3/2004 | Shieh | |
| 6,843,205 | B1 | 1/2005 | Segreto | |
| 7,051,675 | B1 | 5/2006 | Mayer et al. | |
| 7,143,719 | B1 | 12/2006 | Giddens et al. | |
| 7,146,930 | B1 | 12/2006 | Ness | |
| 7,228,816 | B2 * | 6/2007 | Turner | A01K 5/0114 119/51.02 |
| 7,380,518 | B2 | 6/2008 | Kates | |
| 7,395,782 | B1 * | 7/2008 | Lindsay | A01K 5/0114 119/51.02 |
| 7,409,923 | B2 | 8/2008 | Park | |
| 7,426,901 | B2 * | 9/2008 | Turner | A01K 5/0114 119/51.02 |
| 7,458,336 | B2 | 12/2008 | Eu | |
| 7,685,966 | B2 | 3/2010 | Goehring | |
| 7,874,265 | B1 * | 1/2011 | Addleman | A01K 5/025 119/59 |
| 7,895,973 | B1 * | 3/2011 | Whelan | A01K 5/025 119/51.02 |
| 7,913,647 | B1 | 3/2011 | Martin | |
| D649,826 | S | 12/2011 | Garman | |
| 8,100,084 | B1 * | 1/2012 | Abramson | A01K 5/0208 119/51.02 |
| D699,400 | S | 2/2014 | Itzhak-Sigron et al. | |
| 8,863,689 | B2 | 10/2014 | Kalnay et al. | |
| 8,893,658 | B2 | 11/2014 | Jalbert et al. | |
| D720,895 | S | 1/2015 | Yates | |
| 8,925,485 | B2 * | 1/2015 | Pu | A01K 5/0114 119/51.02 |
| 8,930,148 | B2 | 1/2015 | Huisma | |
| D759,905 | S * | 6/2016 | Stewart | D30/122 |
| 2002/0073926 | A1 | 6/2002 | Ness | |
| 2002/0096120 | A1 | 7/2002 | Busha | |
| 2002/0134313 | A1 * | 9/2002 | Andrew King | A01K 5/025 119/51.02 |
| 2005/0217591 | A1 * | 10/2005 | Turner | A01K 5/0114 119/51.02 |
| 2006/0196433 | A1 | 9/2006 | Ness | |
| 2007/0000445 | A1 | 1/2007 | Blais et al. | |
| 2008/0302305 | A1 | 12/2008 | Beaudoin et al. | |
| 2009/0064938 | A1 | 3/2009 | Or | |
| 2010/0132629 | A1 | 6/2010 | Jalbert et al. | |
| 2011/0139076 | A1 * | 6/2011 | Pu | A01K 5/0114 119/51.02 |
| 2011/0197819 | A1 | 8/2011 | Montgomery | |
| 2011/0297090 | A1 | 12/2011 | Chamberlain et al. | |
| 2013/0098298 | A1 | 4/2013 | Manickchan et al. | |
| 2013/0333622 | A1 | 12/2013 | Jin et al. | |
| 2014/0277701 | A1 | 9/2014 | Martin et al. | |
| 2015/0068463 | A1 * | 3/2015 | Worry | A01K 5/0114 119/57.1 |
| 2015/0143750 | A1 | 5/2015 | Jalbert et al. | |
| 2015/0164044 | A1 | 6/2015 | Powers | |

\* cited by examiner

150 – Pet Identifying Collar

TRAY SHUT

TRAY OPEN

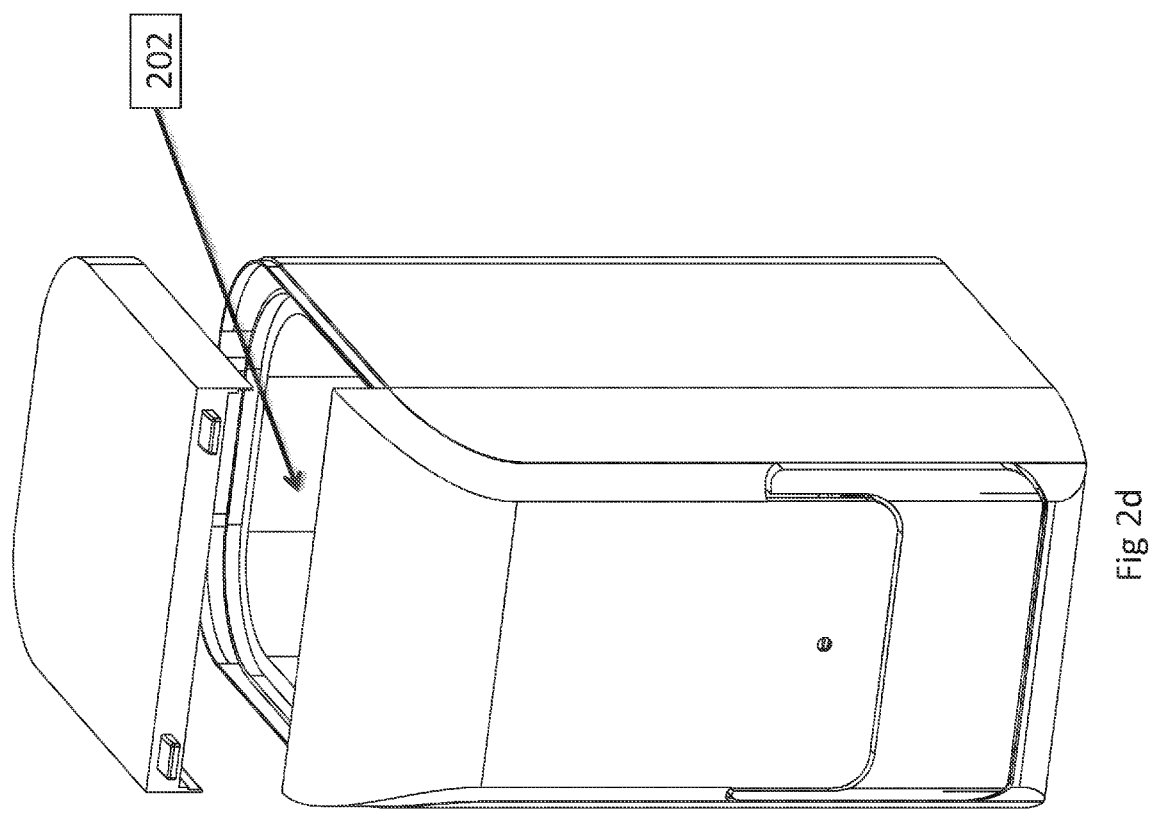

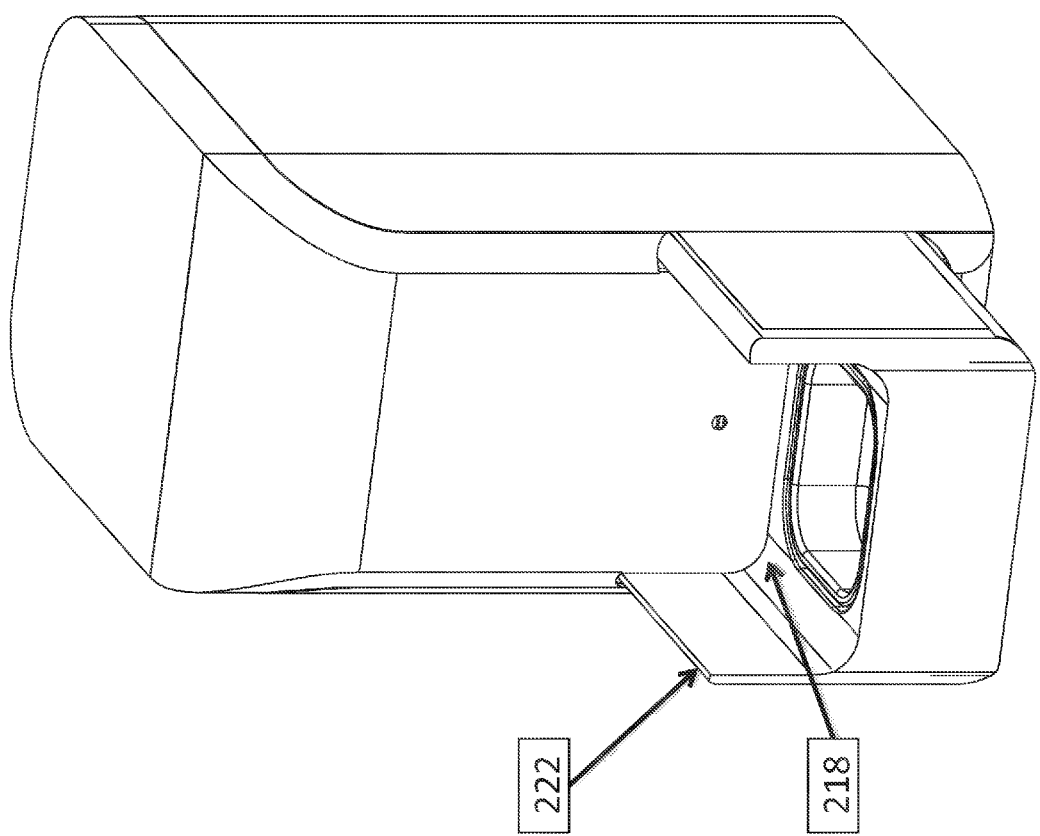

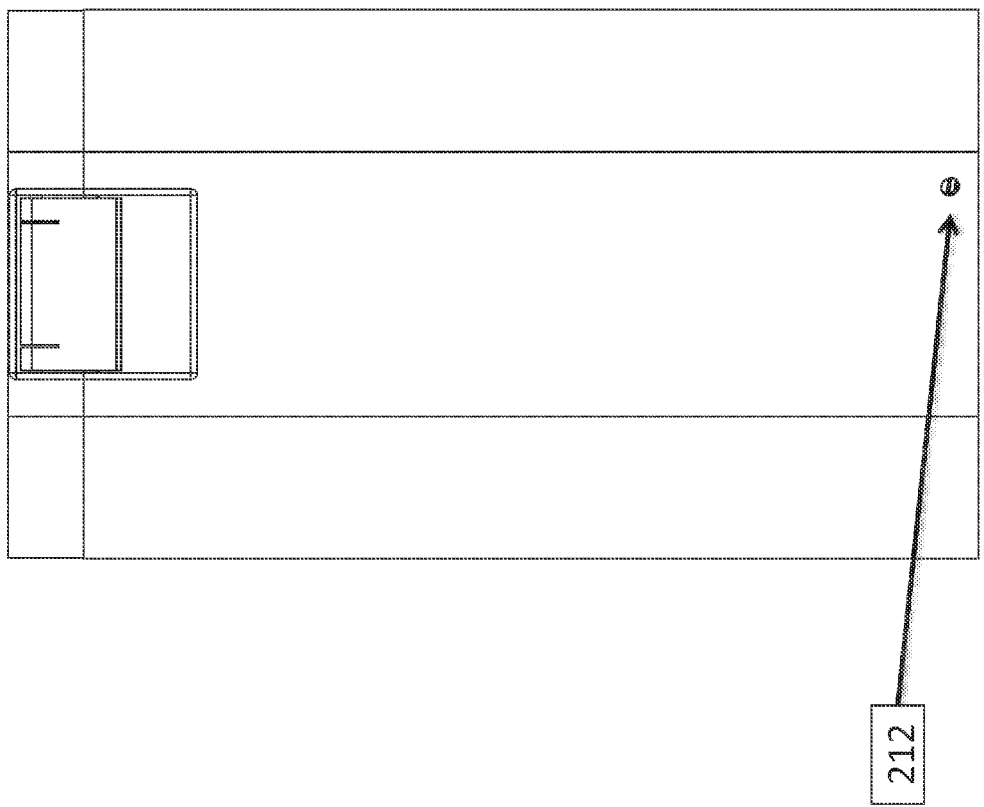

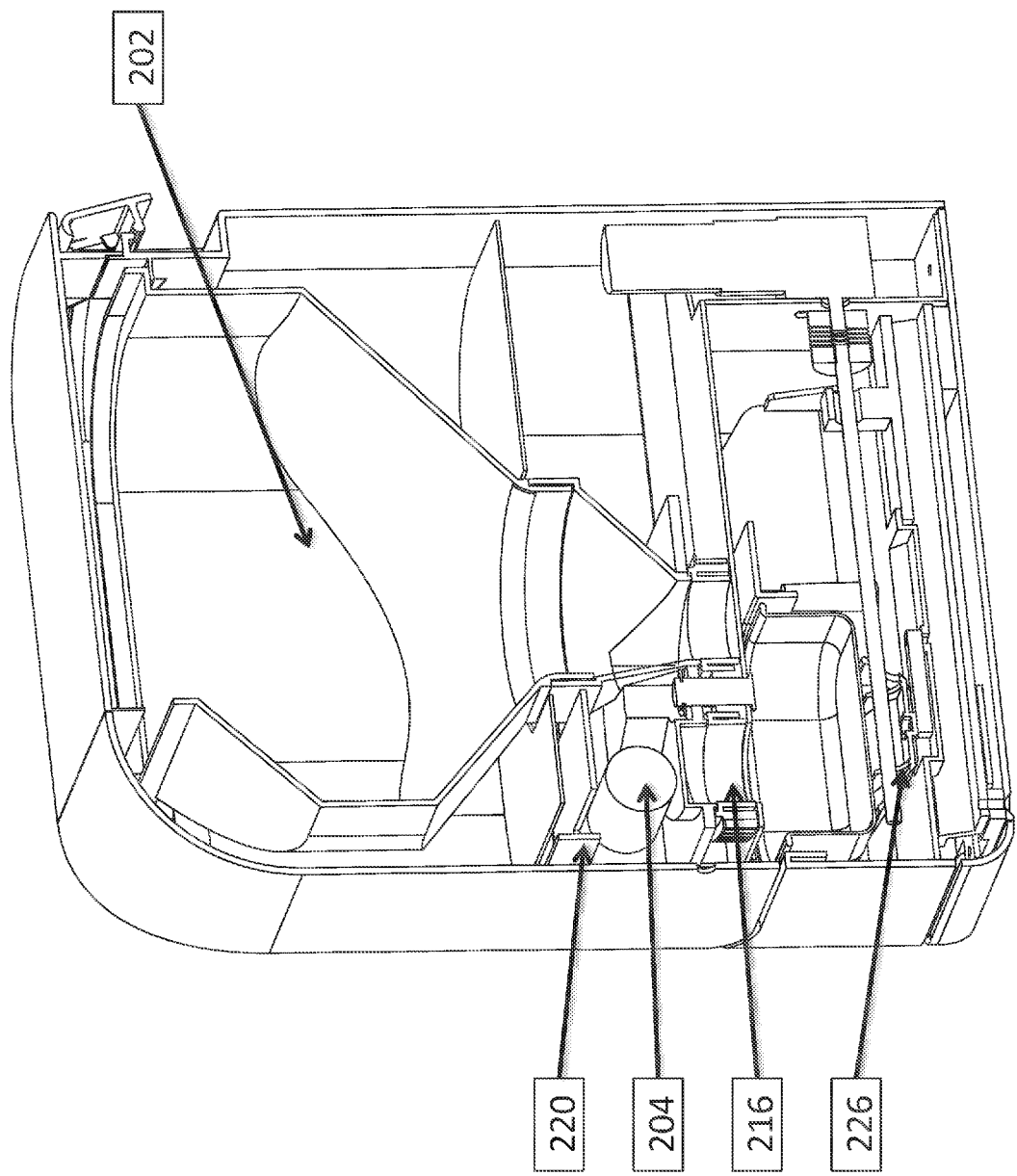

IN-HOME PET FEEDING AND MONITORING SYSTEM

CROSS-REFERENCE TO RELATED APPLICATIONS

This application claims the benefit of U.S. Provisional Application No. 62/004,270, filed May 29, 2014, and U.S. Provisional Application No. 62/039,951, filed Aug. 21, 2014, which is hereby incorporated by reference herein in its entirety.

BACKGROUND

Proper pet feeding and monitoring has become a major concern to pet owners in recent years. Pet owners have busy schedules and are not always available to properly feed and tend to their pet's dietary needs. Additionally, most pet owners do not regularly monitor their pets as many are working during the day outside the home. Devices exist today to allow scheduled feeding of pets. Most of these devices do not connect to a network and do not log any information that can be remotely inspected. As a result, a pet owner really does not know if the device functioned properly and will not know until they come home and inspect the device visually.

Internet enabled pet feeders do exist today but these feeders generally dispense food to a bowl or tray (as do the scheduled feeders previously mentioned). In a multi-pet home (as of 2012 55% of all cat owners in the U.S. have multiple cats and 30% of all dog owners have multiple dogs), any of the pets are enabled to eat the food dispensed. This causes problems for certain pets who have restricted diets and also leads to issues where one pet eats all of the food dispensed and the other pets are left with no food. Additionally, these feeders really are not able to determine how much a pet has eaten. They only know how much food has been dispensed. As a result, it is difficult to track a pet's eating regimen and provide veterinarians with the proper information they need when diagnosing issues. Water consumption is not even considered in the pet devices available. Water consumption amounts (whether high or low) can indicate health issues with pets such as kidney issues or diseases, including diabetes.

SUMMARY

A holistic pet feeding and monitoring system would address these issues. A pet feeder that can be scheduled and set up to only allow authorized pets to access the food would keep pets with dietary restrictions in check. It would also ensure that each pet in a household have access to the proper amount of food at any time they desire to feed. This same pet feeder would record the activity of all pets attempting to access the device and would learn, over time, the proper schedule to set for a pet based on veterinarian recommendations. The feeder would connect wirelessly to the Internet, use a centralized database to store all activity, and make all the activity available remotely via mobile and desktop applications to pet owners and authorized veterinarians and other applicable third parties. A water drinking monitor with the same network connectivity and centralized database storage would add to the holistic system. With feeding data, drinking data, and behavioral data, a pet owner would have the complete picture of the pet's health and welfare. Additionally, this pet feeding and monitoring system would enable remote monitoring and viewing of live video at the device along to proactive alerting (via text messaging, email, social networks, etc.) based on predefined data conditions to provide owners with peace of mind that their pet is safe and eating properly.

BRIEF DESCRIPTION OF FIGURES

FIG. 2d illustrates access to the food storage bin of the pet feeding device, according to some embodiments of the present disclosure.

FIG. 2e is the pet feeding device in the "feeding bowl accessible" state, according to some embodiments of the present disclosure.

FIG. 2f is a status light of the pet feeding device, according to some embodiments of the present disclosure.

FIG. 2g is a cross-section of the pet feeding device, according to some embodiments of the present disclosure.

DESCRIPTION

The present disclosure relates to a network-enabled automated pet feeding and monitoring system providing a series of features not available in any other pet feeding and monitoring product on the market. The described system can be individualized for a single pet or configured to allow more than one pet to utilize the system. In some embodiments, the disclosed system provides personalized feeding options for the pet(s) and will not allow unauthorized pets to feed at the device. In some embodiments, the system will monitor an individual pet's water consumption. In some embodiments, the system connects wirelessly to the wide area network and monitors/logs all activity (pet accessing, feeding times/durations, food dispensing, food consumption amounts, water consumption, comfort settings, unauthorized access attempts, photos, video) occurring at the device. The logs are aggregated in a database for use by mobile applications, desktop web applications, and an alerting rules engine so that data can be consumed easily and anywhere by pet owners and other interested third parties.

The pet feeding and monitoring system enables owners to set a feeding schedule, assign the feeder to a specific pet so that no other pet is allowed to eat at the feeder, assign a feeder to multiple pets, remotely dispense food via a web browser or smartphone application, monitor eating times, monitor food consumption over time, monitor water consumption, monitor the pet's environment (temperature and humidity), provide pet-specific audible notifications, and remotely view the pet. Owners can customize the amount of food dispensed along with feeding times to meet the needs of the pet. Multiple pet feeders can be networked with each other into a group so that they can exchange information to determine the optimal amount of food to deliver to authorized pets. An amount of food may be determined by volume, calorie content of the food in the bin, or other known measurements. The pet feeder has a "Training Mode" that uses motion sensing to help acclimate pets to the feeder while still preventing unauthorized access. The pet feeder also has a "Learn Mode" that creates a customized feeding schedule for your pet based on data collected by the device's various sensors. The system can be set in an advanced mode called "Pet Profiles" that will automatically authorize/deny access to a pet based on a pet's predefined profile. All data collected by the pet feeding and monitoring system is stored on a networked server database and used by a rules engine (in addition to applications) to send predefined alerts (based on data conditions) to authorized parties (pet owners, veterinarians, etc.).

Figure 1A:
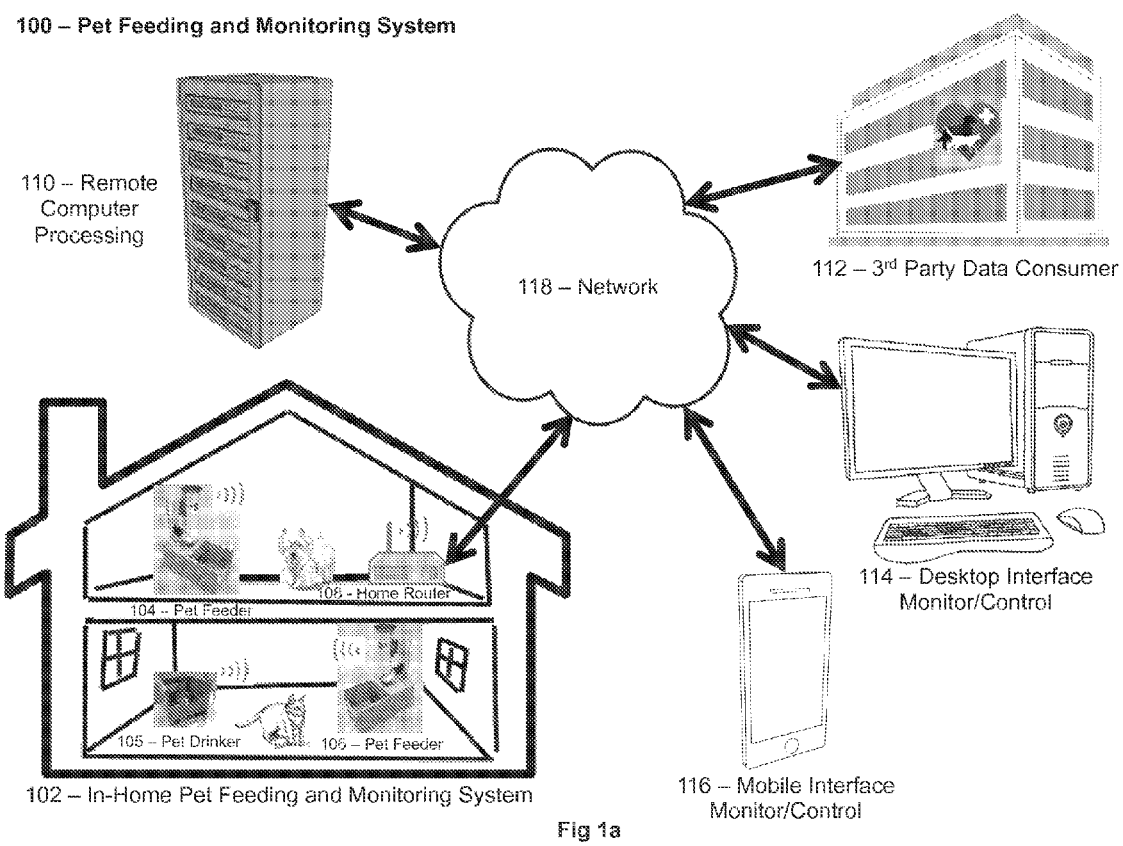
FIG. 1a is a system diagram that depicts a holistic pet feeding solution, according to embodiments of the present disclosure.

FIG. 1a is a system diagram that depicts a holistic pet feeding solution, according to embodiments of the present disclosure. The described holistic system connects all components via both local wireless protocols and a wide area network. For example, as shown in FIG. 1a, system 100 can include an in-home pet feeding system 102, including one or more pet feeders 104, 106, one or more pet drinking monitors 105, all connected to a wide area network 118 through a home router 108, one or more remote computers 110, a computer located at a third party data consumer 112, a desktop interface 114, and a mobile interface 116.

The in-home pet feeding and monitoring system 102 can include one or more pet feeders 104, 106. In some embodiments, the one or more pet feeders can connect wirelessly via the home router 108. The home router 108 can connect the in-home pet feeding and monitoring system to all other components of the system.

The in-home pet feeding and monitoring system 102 can include one or more pet drinkers 105. In some embodiments, the one or more pet drinkers can connect wirelessly via the home router 108. The home router 108 can connect the in-home pet feeding and monitoring system to all other components of the system The remote computer processing 110 can be in-house or can be one or more third party servers that host the pet feeding and monitoring system software. The remote computer processing 110 can be connected to the in-home pet feeding system 102 via the wide area network 118. In some embodiments, the remote computers run databases, application servers, and web servers in addition to the pet feeding and monitoring software. In some embodiments, the remote computers run a rules engine for analyzing data and generating automated alerts.

FIG. 1a, component 112 depicts third parties that can consume/subscribe to the information/alerts from the pet feeding and monitoring system. They can connect via web applications (through the wide area network 118) or via web service interfaces.

FIG. 1a, component 114 depicts desktop interfaces that can be used by pet owners to monitor and remotely control the in-home pet feeding and monitoring system 102 via the remote computers 110. Pet owners can also subscribe to predefined data alerts via the desktop interfaces.

FIG. 1a, component 116 depicts mobile interfaces used by pet owners to monitor and remotely control the in-home pet feeding and monitoring system 102 via the remote computers 110. Pet owners can also subscribe to predefined data alerts via the mobile interfaces.

FIG. 1a, component 118 depicts the wide area network (WAN). The WAN can provide all external access to the in-home pet feeding and monitoring system.

Figure 1B:
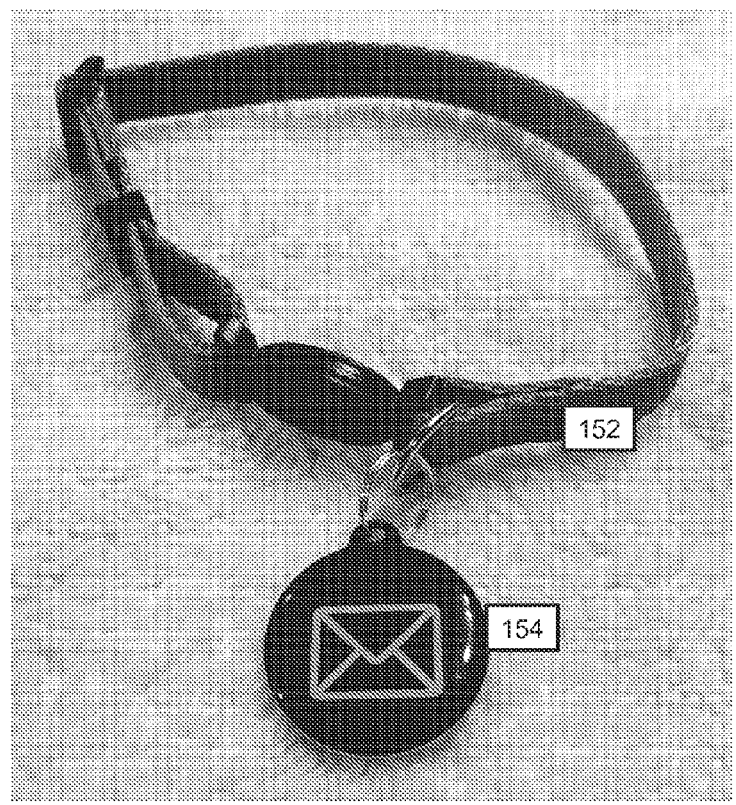
FIG. 1b depicts a pet identifying collar, according to embodiments of the present disclosure.

FIG. 1b, depicts a Pet Identifying Collar 150. The Pet Identifying Collar is composed of a safety breakaway collar 152 and a radio frequency tag 154. The radio frequency tag 154 is read by the pet identity readers (206 on the pet feeding device and 304 on the pet drinking monitor) and compared against the Network Pet Database 2000 to determine the identity of the pet and any other pertinent data about the pet (authorized for feeder, feeding schedule, diet, unique characteristics, etc.).

Figure 2A:
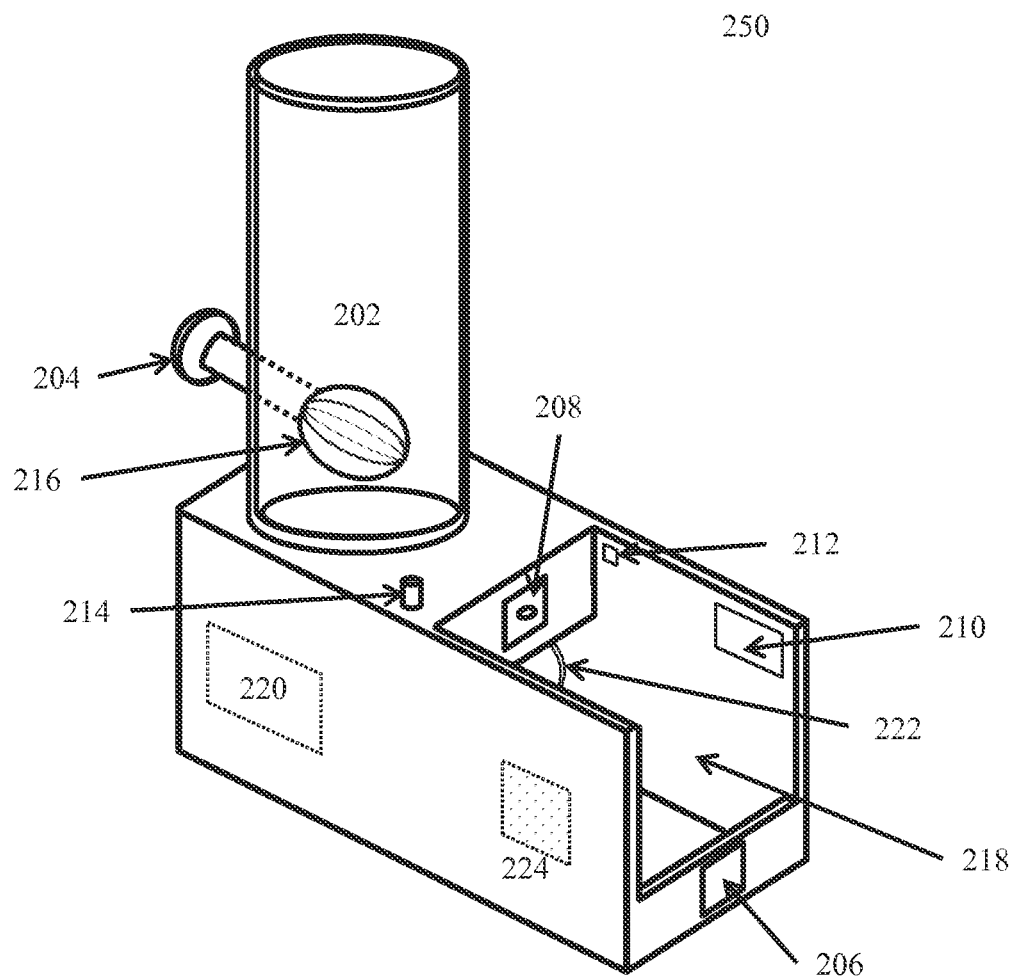
FIG. 2a depicts a pet feeding device in the "feeding bowl not accessible" state, according to some embodiments of the present disclosure.

FIG. 2a depicts a pet feeding device 250 in the "feeding bowl not accessible" state. The pet feeding device provides: a) feeding to only authorized pets; b) food dispensing per set schedule, learned schedule, and manual mode; c) remote control via the WAN; d) training mode so that pets can easily be acclimated to feeder; and e) other options as described herein. The pet feeding device 200 includes: a food storage bin 202, a food dispensing motor 204 to dispense food in accurate increments, a pet identity reader 206 for uniquely identifying pets, a camera 208 for taking pictures and video, a motion sensor 210 for detecting motion near and around the pet feeding device, an LED light 212 for displaying various statuses, a temperature/humidity sensor 214 for logging comfort at the pet feeding device, a food dispensing wheel 216 that is moved by the food dispensing motor 204 to dispense food in accurate increments, a single-entry feeding zone 218 to ensure that a pet can uniquely be identified and to also ensure only one pet feeds at a time, a microprocessor/storage/wireless network/IO component 220 to run the pet feeding device software and to connect to the LAN/WAN, an extendable/retractable food serving bowl 222 so that food can be provided or removed based on pet identity, and a speaker 224 so that audible pet-specific notifications can be emitted by the feeder.

FIG. 2a shows the food storage bin 202. The bin is used to keep a number of days of dry pet food fresh and available for dispensing. The food storage bin can be easily removed for cleaning.

FIG. 2a shows the food dispensing motor 204. The food dispensing motor connects to the food storage bin (202) and moves the food dispensing wheel (216) so that specific increments of food can be moved to the food serving bowl (222).

FIG. 2a shows the pet identity reader. This is used to detect the pet attempting to access the pet feeding device. Authorized pets can be given access to food. Unauthorized pets can be denied access to food. To be uniquely identified, the pet wears a collar with a radio frequency tag attached (shown in FIG. 1b). The tag has a unique id that can be read wirelessly by the pet identity reader. The identifier on the pet collar is then compared to all authorized ids for the feeder (stored in the 'storage' piece of the microprocessor/storage/wireless network/IO component 220). If the identifier is in the list of authorized identifiers, then the food is made available to the pet; if not, the food is not made available.

FIG. 2a shows the camera 208. The camera is used to take pictures of pet when feeding, when denied access, or remotely ad hoc by owner. The camera is also used to display real-time video remotely through mobile and desktop applications.

FIG. 2a also shows the motion sensor 210. The motion sensor is used during "Training Mode" to make food available to the pet when motion is detected. This helps to acclimate the pet to the feeder by drawing the pet into the feeder. The pet identity reader 206 takes over when the pet comes close to the feeder to eat. If the pet is authorized, then food is kept available. If the pet is not authorized, then the food bowl retracts into the feeder and is not available for the pet.

FIG. 2a shows the LED light 212. This is used to display various status of the feeder including: a) online/offline; b) dispensing food; and c) food tray open.

FIG. 2a shows the temperature/humidity sensor 214. This is used to periodically log the temperature and humidity of the environment allowing the owner to see the comfort of the pet environment remotely and over time. It is used to alarm the owner if the comfort level falls outside designated thresholds.

FIG. 2a shows the food dispensing wheel 216. This is used to dispense food in compartment-sized accurate increments into the food tray while the food tray is retracted in the feeder. This can dispense based on schedule, "Learned Schedule", or manually via mobile or desktop applications.

FIG. 2a shows the single entry feeding zone 218. This feature only allows one pet to feed at a time. In one embodiment, a pet is forced to feed from one side of the feeder. This side of the feeder does not block access to the feeding bowl. There are four positions of access to the bowl. They are: a) the front; b) the right side; c) the left side; and d) the back. Only the front is accessible for feeding. Position a) (the front) is known as the single entry feeding zone. All other access points (positions b), c), and d)) are blocked from entry. This keeps other pets away while the authorized pet feeds. This zone also optimizes reading of the pet identity via the pet identity reader 206. The pet identify reader is positioned for optimal reading at the single entry feeding zone.

FIG. 2a shows the internal microprocessor/storage/wireless network/IO component 220. This can be an internal computer containing all components necessary to run the local application and local web server. This also contains wired and wireless network connectivity to interface with the remote computers 110 so that data logs from the pet feeding device can be transmitted to shared WAN servers. Component 220 can run a local web server to enable local configuration of the device (schedule, alert thresholds, authorized pets, etc.) and can provide all inputs/outputs for a local pet feeding device (e.g., motors, sensors, etc.).

FIG. 2a shows the extendable/retractable food serving bowl 222. This component 222 can be used to extend the feeding bowl to the feeding area when authorized pets attempt to access the pet feeding device. This can be used to retract the bowl from the feeding area when unauthorized pets attempt to access the pet feeding device. The extendable/retractable food serving bowl is operated via a mechanical drawer that is controlled by the IO piece of the microprocessor/storage/wireless network/IO component 220.

FIG. 2a shows the audible speaker 224. This component 224 can be used to emit unique audible sounds or recorded messages based on a variety of factors including authorization to feed, denial of feeding, and the various reasons for each. For example, an audible notification for a specific pet might be emitted when food is dispensed to the food bowl based on a predefined feeding schedule. This could be unique to this scenario and unique for this pet so that this specific pet will associate feeding time with the sound or recorded message emitted.

Figure 2B:
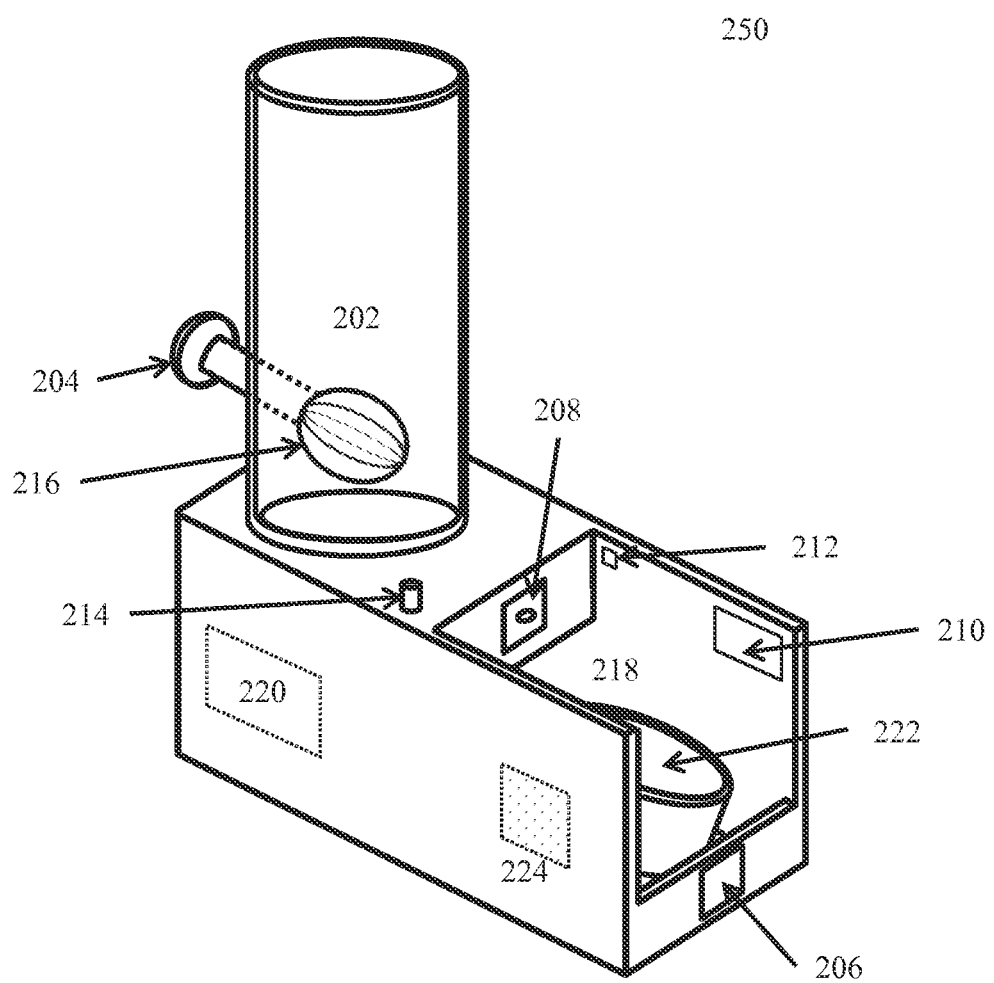
FIG. 2b is the pet feeding device in the "feeding bowl accessible" state, according to some embodiments of the present disclosure.

FIG. 2b is the pet feeding device 250 in the "feeding bowl accessible" state. This state is achieved when a pet with an authorized tag, approaches the device and is detected by the pet identity reader (FIG. 2a, component 206).

Figure 2C:
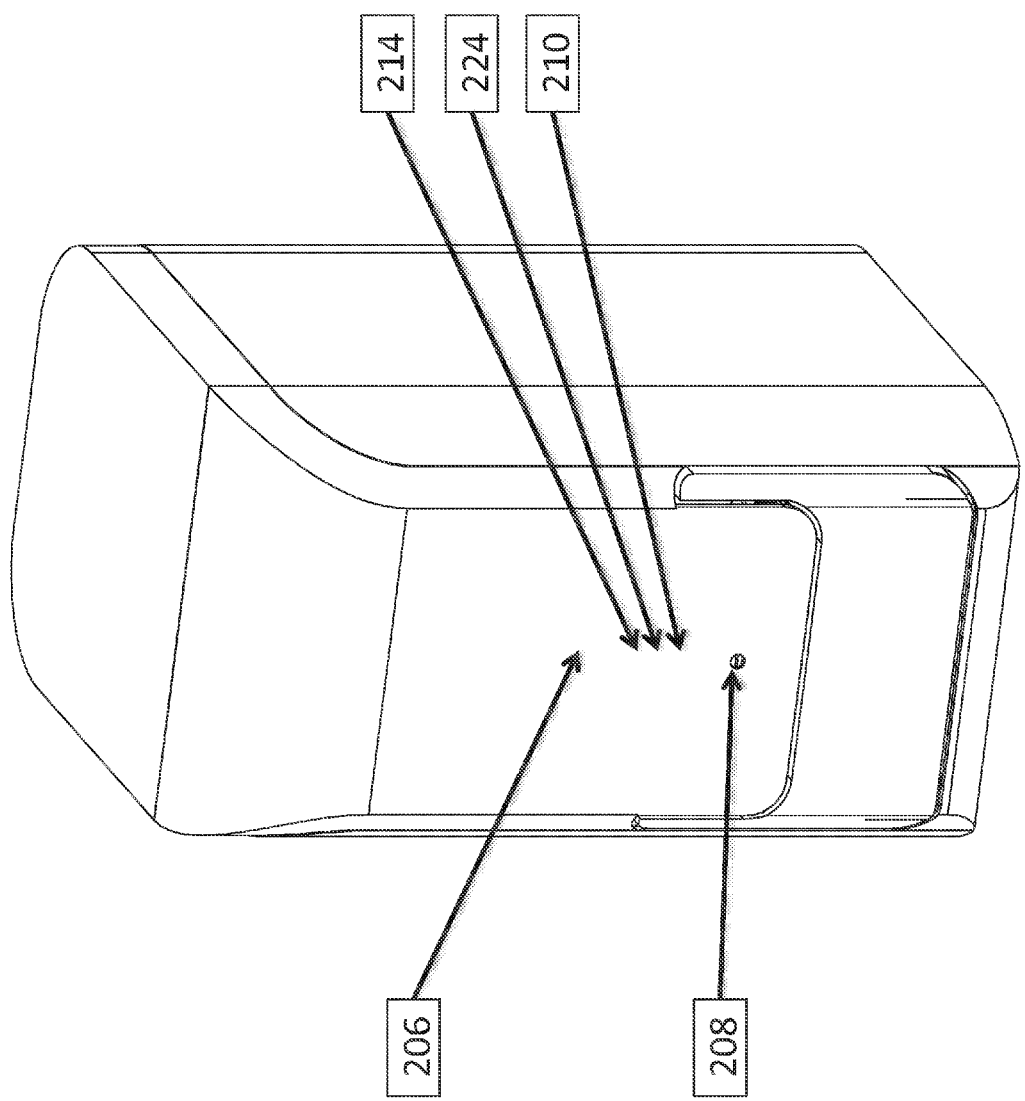
FIG. 2c is the pet feeding device in the "feeding bowl not accessible" state, according to some embodiments of the present disclosure.

FIG. 2c illustrates an alternative exterior shell of the pet feeding device, with the extensible/retractable feeding bowl 222 of the device in a closed state. Pet identity reader 206, camera 208, motion sensor 210, temperature/humidity sensor 214, and speaker 224 are all available while the device is closed.

FIGS. 2d-f illustrate specific aspects of this alternative exterior shell. FIG. 2d illustrates access to the food storage bin 202 while the pet feeding device is closed. FIG. 2e illustrates the additional embodiment of the device with the extensible/retractable bowl 222 in an extended state. There are four positions of access to the bowl while the bowl is extended. They are: a) the front; b) the right side; c) the left side; and d) the back. Only the front is accessible for feeding. Position a) (the front) is known as the single entry feeding zone. All other access points (positions b), c), and d)) are blocked from entry. This keeps other pets away while the authorized pet feeds. The structure defining the single entry feeding area 218 moves with the bowl as it extends or retracts, minimizing device size in the retracted state. FIG. 2f illustrates one possible placement of the LED light 212.

FIG. 2g is a cross sectional view of the alternative exterior shell. Food storage bin 202 contains food to be fed to the pet. Dispensing motor 204 operates to move food dispensing wheel 216 and thereby deliver food from the food storage bin 202 to the retracted extensible/retractable bowl. Weight measurement sensor 226 (e.g., a load cell or scale) determines the weight of food present in extensible/retractable feeding bowl 222.

Figure 3:
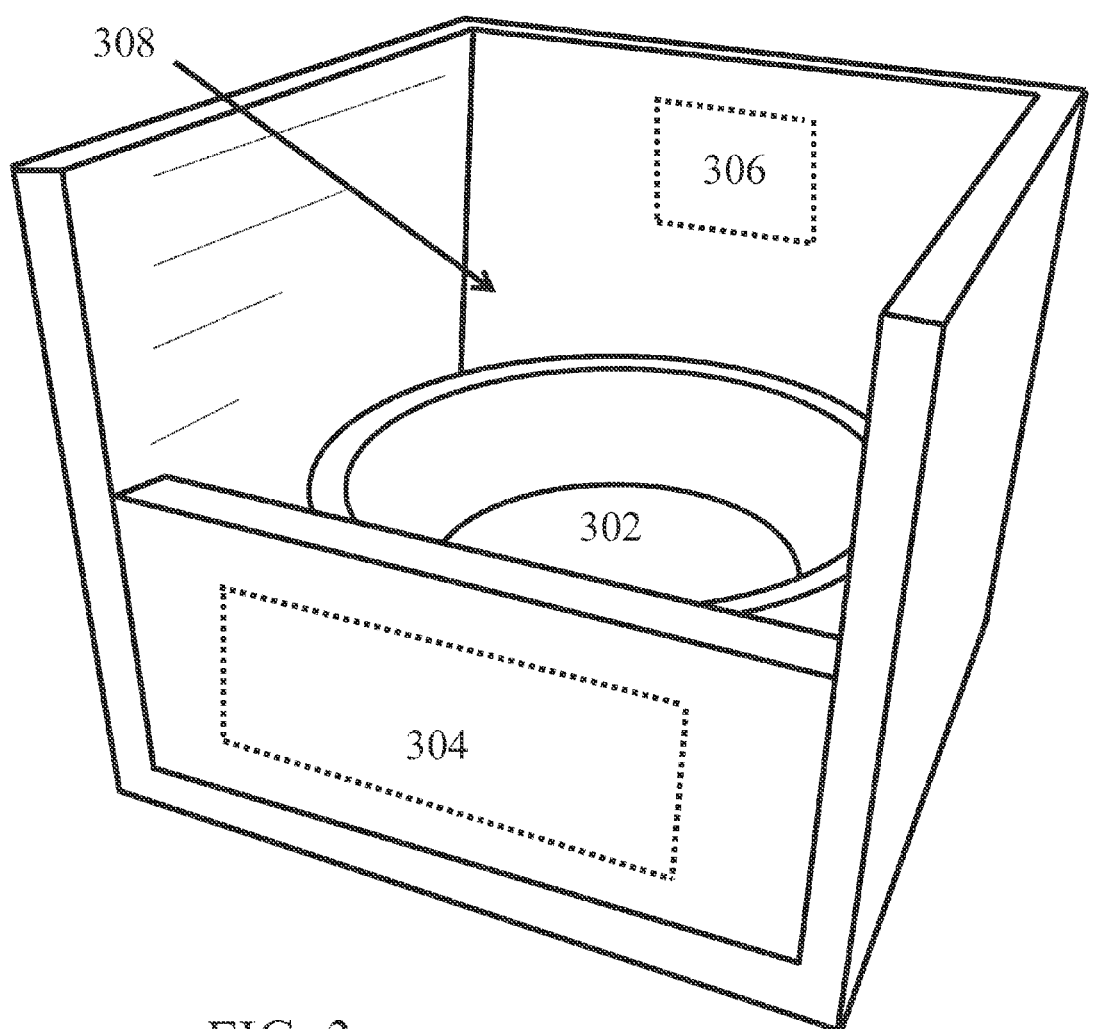
FIG. 3 is the pet drinking device, according to some embodiments of the present disclosure.

FIG. 3 is a pet drinking device 300. The pet drinking device 300 monitors water consumption associated uniquely with a pet. The pet drinking device 300 includes: a water bowl 302, a pet identity reader 304 for uniquely identifying pets, a microprocessor/storage/wireless network/IO component 306 to run the pet drinking device software and to connect to the LAN/WAN, and a single-entry drinking zone 308 to ensure that a pet can uniquely be identified and to also ensure only one pet drinks at a time.

FIG. 3 shows the pet identity reader 304. This is used to detect the pet accessing the pet drinking device. To be uniquely identified, the pet wears a collar with a radio frequency tag attached. The tag has a unique id that can be read wirelessly by the pet identity reader. The identifier on the pet collar is then is compared to the Network Pet Database 2000 (shown in FIG. 13) to determine the pet's identity.

FIG. 3 shows the single entry feeding zone 308. This feature only allows one pet to drink at a time. In one embodiment, a pet is forced to drink from one side of the feeder. This side of the device does not block access to the drinking bowl. There are four positions of access to the bowl. They are: a) the front; b) the right side; c) the left side; and d) the back. Only the front is accessible for drinking Position a) (the front) is known as the single entry drinking zone. All other access points (positions b), c), and d)) are blocked from entry. This keeps other pets away while a single pet drinks so that a drinking session for a single pet can be established. This zone also optimizes reading of the pet identity via the pet identity reader 304. The pet identity reader is positioned for optimal reading at the single entry drinking zone.

Figure 4:
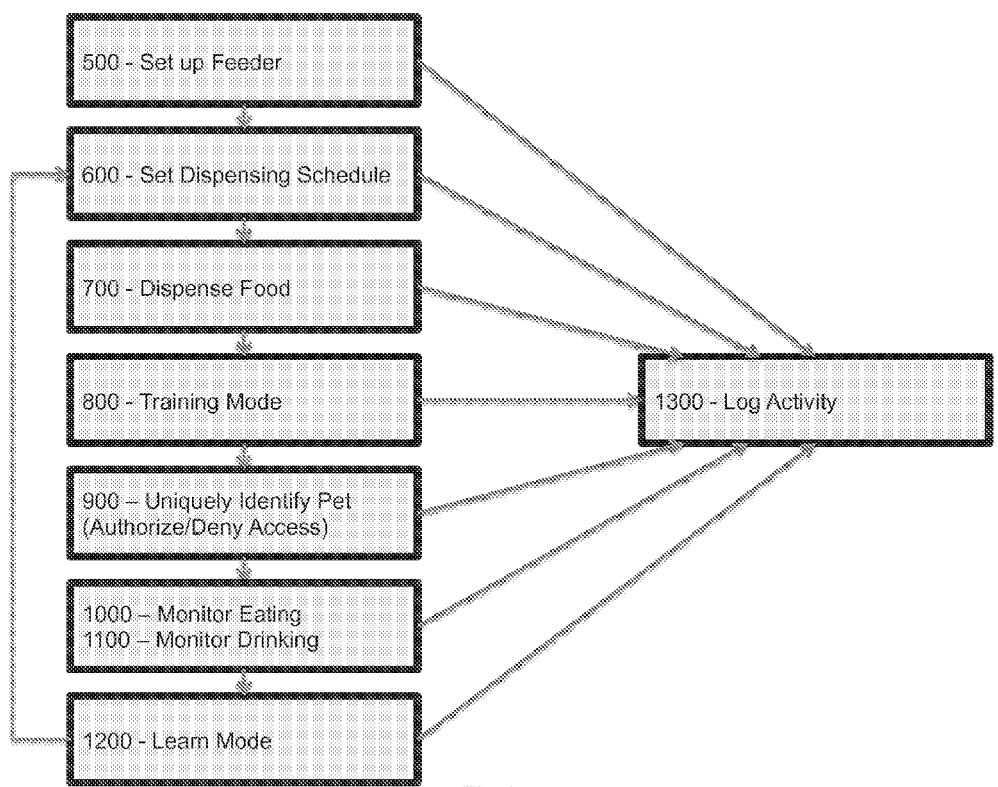
FIG. 4 contains a high level flow for the pet feeding and monitoring system, according to some embodiments of the present disclosure.

FIG. 4 contains the high level flow 400 for the pet feeding and monitoring system. The flow begins with Set Up Feeder 500, proceeds through Set Dispensing Schedule 600, Dispense Food 700, an optional Training Mode 800, Uniquely Identify Pet 900, Monitor Eating 1000, Monitor Drinking 1100, and Learn Mode 1200. Once a feeder has been set up, steps 600 through 1200 are continuously performed during the lifecycle of the pet feeding device. All processes log activity to the Network Pet Database 2000 via the Log Activity 1300 process.

Figure 5:
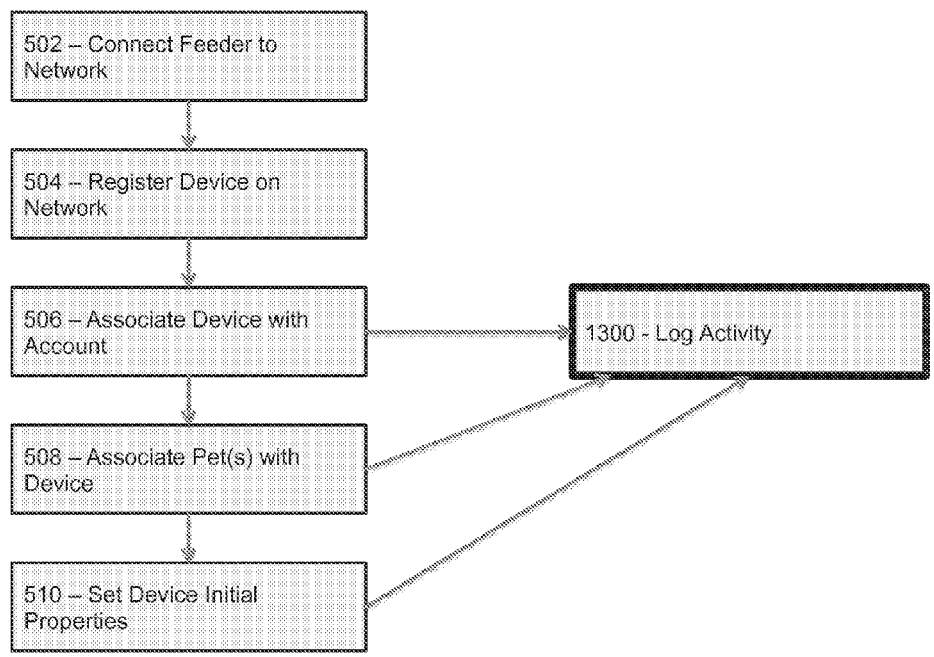
FIG. 5 contains a flowchart for Setup Pet Feeder, according to some embodiments of the present disclosure.

FIG. 5 contains a flowchart for Setup Pet Feeder 500. The user can first Connect the Feeder to the Network 502 via standard LAN protocols. Once connected, the user can Register the Device on the Network 504 by entering data into a web application on a desktop or mobile interface. The next step of this process is to Associate the Device with an Account 506 and to Associate Pet(s) With the Device 508. Finally, a number of properties are set on the device via the Set Device Initial Properties process 510. Steps 506, 508, and 510 all Log Activity 1300 to the Network Pet Database 2000. After setup, the pet feeding device can be connected to the remote computers 110 and available for feeding, monitoring, remote control, and alerting.

FIG. 5, step 502 can connect the pet feeding device to a home router 108 using a local area network wired or wireless protocol. This can establish a connection to both the home router 108 local network and the WAN 118.

FIG. 5, step 504 can register the pet feeding device with the Network Pet Database 2000. This can make the pet feeder available for owner and pet assignment.

FIG. 5, step 506 assigns an account (associated with an owner) to the pet feeding device. This can provide the owner with access to properties of the device.

FIG. 5, step 508 contains the steps for assigning a feeder to one or more pets via a desktop or mobile application. During this process both the Local Feeder Data Store 1106 and the Network Pet Database 2000 are updated with data necessary to make the connection between pet and feeder, and authorize access into the feeder.

FIG. 5, step 510 allows the owner to set initial properties of the feeder including owner details and pet details. This can determine who can access the feeder and specific processing attributes for the pet.

FIG. 5, steps 506, 508, and 510 all log database entries per the Log Activity 1300 process.

Figure 6:
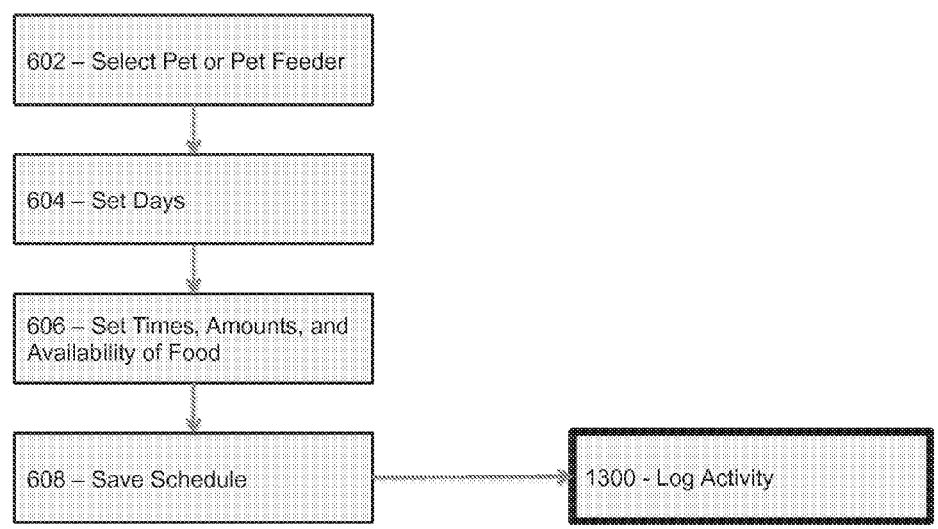
FIG. 6 contains a flowchart for a Set Dispensing Schedule process, according to some embodiments of the present disclosure.

FIG. 6 contains a flowchart for the Set Dispensing Schedule 600 process. Components of this process are Select Pet or Pet Feeder 602, Set Days 604, Set Times/Amounts/Availability 606, and Save Schedule 608. After setup, the schedule can be stored on both the Local Feeder Data Store 1106 and the Network Pet Database 2000. This schedule is then used to determine when to dispense food on the pet feeding device. The schedule also can provide information on availability of food for authorized pets (i.e., times of the day when they are allowed to feed).

Figure 7:
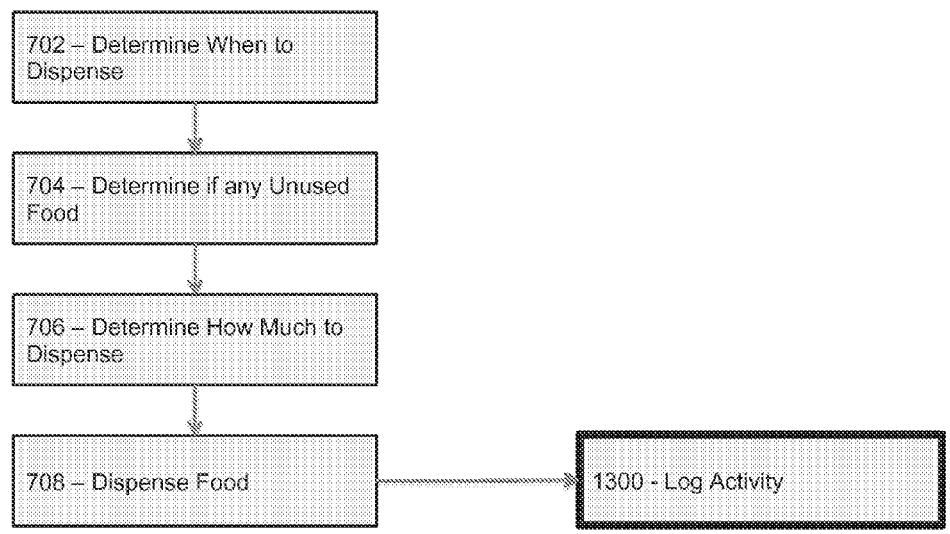
FIG. 7 contains a flowchart of the Dispense Food process, according to some embodiments of the present disclosure.

FIG. 7 contains a flowchart of the Dispense Food 700 process. The Dispense Food process runs locally on the microprocessor of the pet feeding device and can be determined via Learn Mode 1200 or manually via Set Dispensing Schedule 600. This process is started at feeder start time and runs continuously. Components of this process are Determine When to Dispense 702, Determine If Any Unused Food 704, Determine How Much to Dispense 706, and Dispense Food 708. After Dispense Food 708 is processed, the Log Activity 1300 process is called to store the event.

FIG. 7, step 702 determines whether the feeder is set to Learn Mode or Manual Mode. Based on that, the feeder checks for the appropriate time of feeding. If a time has been reached, it proceeds to Determine if any Unused Food 704.

FIG. 7, step 704 checks if any unused food remains in the feeding bowl. In some embodiments, this check is performed using the weight measurement sensor 226. This process passes the amount of unused food to step 706 Determine How Much Food to Dispense.

FIG. 7, step 706 subtracts the unused food from the scheduled food amount for the current time period to determine amount to dispense. This amount is passed to the step 708 Dispense Food.

FIG. 7, steps 708 calls the food dispensing mechanism with a value that will dispense the amount of food derived in step 706. The Log Activity 1300 process is then called to record the associated entry.

Figure 8:
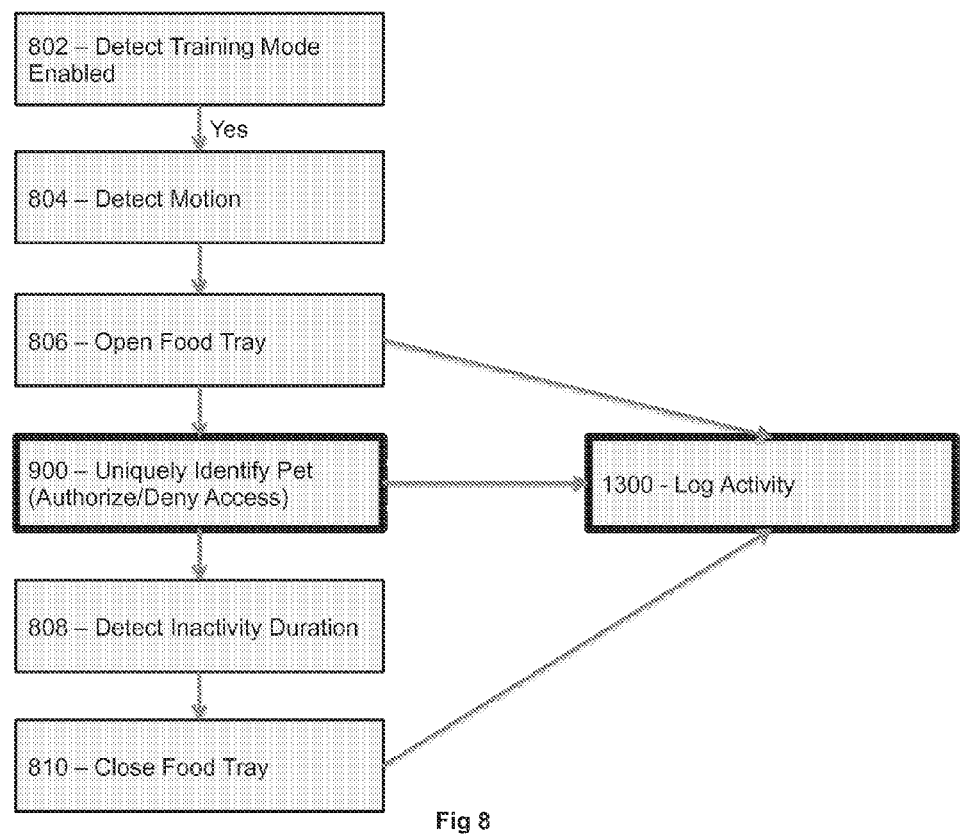
FIG. 8 contains a flowchart of the Training Mode process, according to some embodiments of the present disclosure.

FIG. 8 contains a flowchart of the Training Mode process 800. Training Mode allows a pet to quickly learn how to use the pet feeding device. Training Mode 800 utilizes a motion sensor to make food available to the pet and draw them into the feeder. Once the pet is close enough to the feeder, the pet identity reader determines if they are authorized. Components of the Training Mode process are Detect Training Mode Enabled 802, Detect Motion 804, Open Food Tray 806, Uniquely Identify Pet 900, Detect Inactivity Duration 808, and Close Food Tray 810. Steps 806, 900, and 810 all call Log Activity 1300 to record associated entries.

FIG. 8, step 802 checks to see if training mode is enabled. If training mode is enabled, the process continues (otherwise it terminates).

FIG. 8, step 804 continuously checks for motion near the pet feeding device. If motion is detected, the next step (806) is called. Step 806 can open the food tray.

FIG. 8, step 900 can check for an authorized pet should a pet attempt to feed from the available food tray. If the pet is authorized, the food tray can remain open. If not, the food tray can close.

FIG. 8, step 808 can determine if the inactivity period has been reached. If no pet is identified within the inactivity period, then step 810 can be called and the food tray can close.

Figure 9:
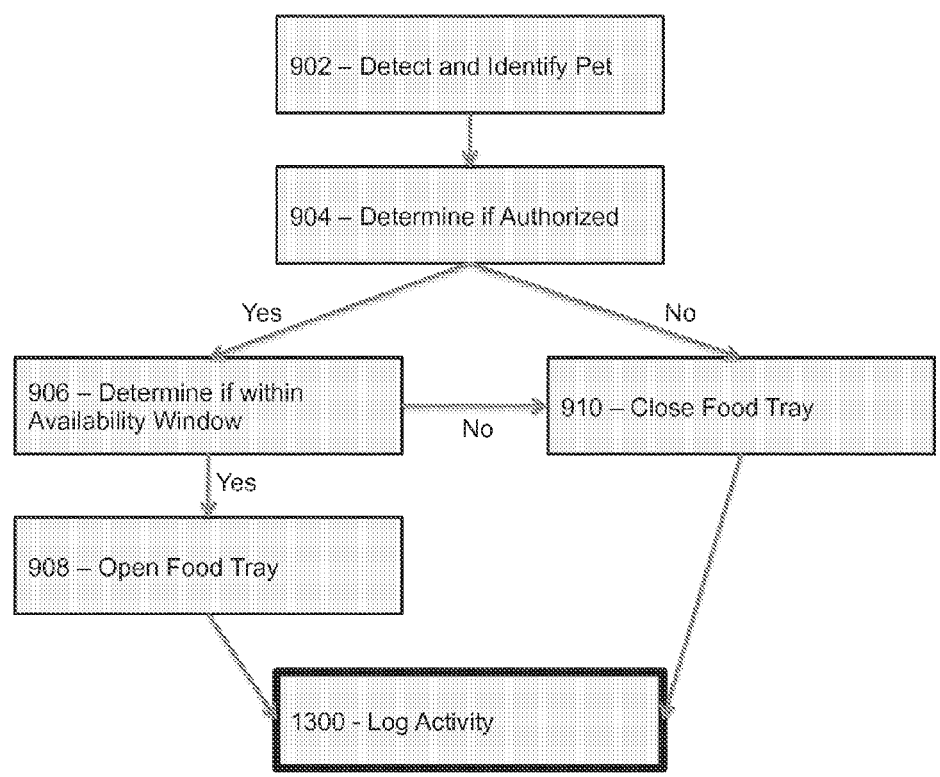
FIG. 9 contains a flowchart of the Uniquely Identify Pet (Authorize/Deny Access) process, according to some embodiments of the present disclosure.

FIG. 9 contains a flowchart of the Uniquely Identify Pet (Authorize/Deny Access) process 900. This process is to determine whether to make food accessible to the pet or not. This process is run at feeder startup and runs continuously, always checking to see if a pet has approached the pet feeding device. Components of this process are Detect and Identify Pet 902, Determine if Authorized 904, Determine if within Availability Window 906, Open Food Tray 9008, and Close Food Tray 910. Steps 908 and 910 can log associated entry via the Log Activity 1300 process.

FIG. 9, step 903 puts the pet identity reader into poll mode and waits to detect a unique pet. If a unique pet is identified, the unique identity is passed to step 904 to Determine if the pet is Authorized.

FIG. 9, step 906 is called if the pet is authorized to feed. This step checks to ensure whether the pet is within a food availability window. If so, step 908 is called and the food tray is opened for feeding. If the food availability window is not available, then step 910 is called and the food tray is closed.

FIG. 9, if step 704 detects a tag id, the unique identifier is compared to the authorized tag for the feeder (in this case, only 1 tag) (706).

FIG. 9, step 910 is also called to close the food tray if the pet was not authorized in step 904 (Determine if Authorized).

Figure 10:
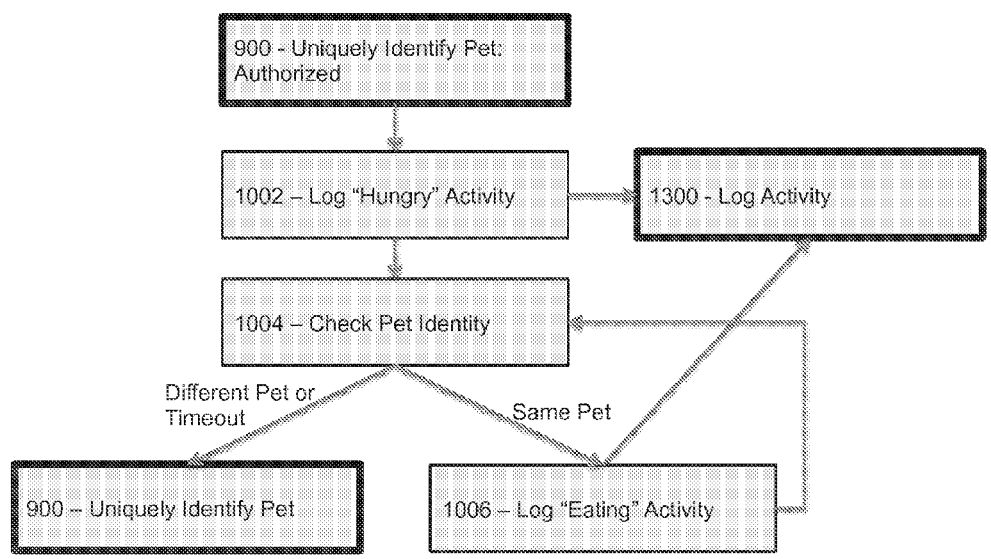
FIG. 10 contains a flowchart of the Monitor Eating process, according to some embodiments of the present disclosure.

FIG. 10 contains a flowchart of the Monitor Eating process 1000. Monitor Eating runs when Uniquely Identify Pet 900 detects an authorized pet within the food availability window. Monitor Eating first runs Log "Hungry" Activity 1002 via the Log Activity process 1300. It then continuously checks for a unique pet identity via Check Pet Identity 1004 until a timeout has occurred or if a different pet is identified. If a different pet is identified or a timeout occurs, then Uniquely Identify Pet 900 is restarted. If the same pet is identified, then Log "Eating" Activity 1006 occurs using the Log Activity process 1300 and Check Pet Identity 1004 is re-called.

Figure 11:
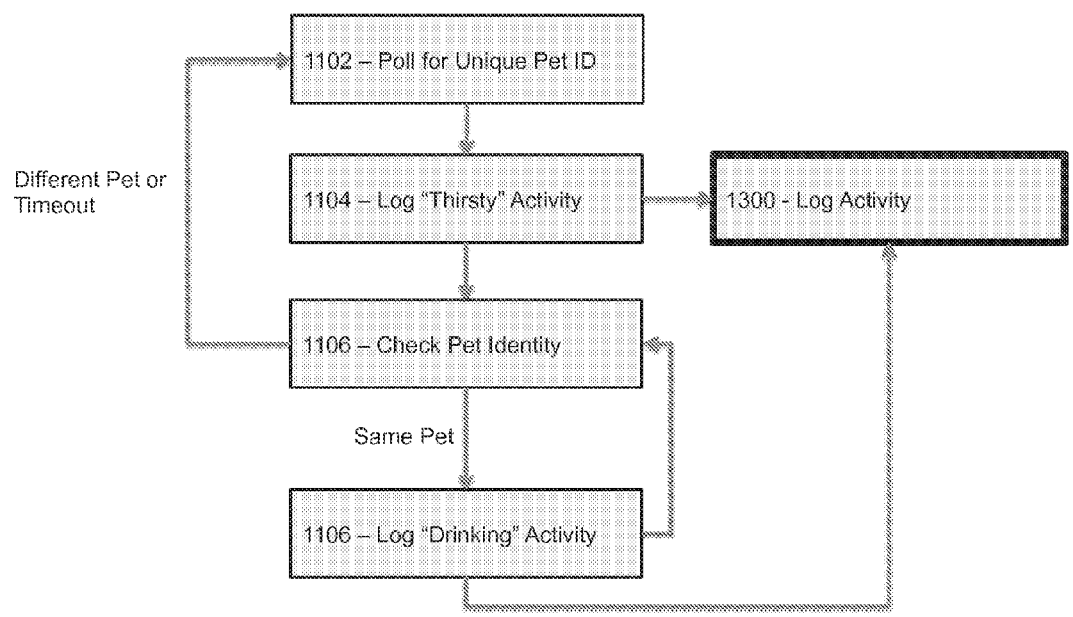
FIG. 11 contains a flowchart of the Monitor Drinking process, according to some embodiments of the present disclosure.

FIG. 11 contains a flowchart of the Monitor Drinking process 1100. Monitor Drinking is constantly Polling for a Unique Pet ID 1102. When a uniquely pet id is found, it runs the Log "Thirsty" Activity 1104 via the Log Activity process 1300. It then continuously checks for a unique pet identity via Check Pet Identity 1106 until a timeout has occurred or if a different pet is identified. If a different pet is identified or a timeout occurs, then Poll for Unique Pet ID 1102 is restarted. If the same pet is identified, then Log "Drinking" Activity 1106 occurs using the Log Activity process 1300 and Check Pet Identity 1106 is re-called.

Figure 12:
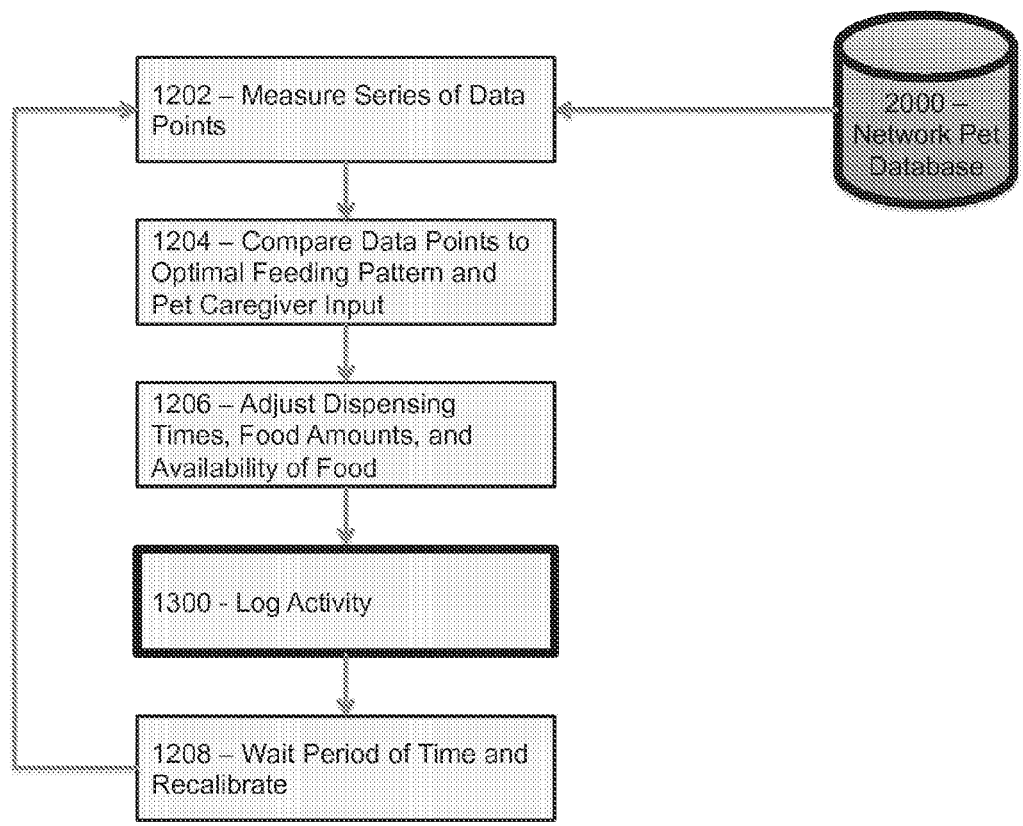
FIG. 12 contains a flowchart of the Learn Mode process, according to embodiments of the present disclosure.

FIG. 12 contains a flowchart of the Learn Mode 1200 process. This process (when activated) can evaluate pet feeding data with optimal feeding patterns and pet owner input to create a healthy feeding scheduled customized for a specific pet. Components of this process are Measure Series of Data Points 1202, Compare Data Points to Optimal Feeding Pattern and Pet Caregiver Input 1204, Adjust Dispensing Times, Food Amounts, and Availability 1206, and Wait Period of Time and Recalibrate 1208. Every time the Learn Mode schedule is adjusted, a call to Log Activity 1300 is made to record the associated data entries. The Network Pet Database 2000 is used to gather historical data points.

Figure 13:
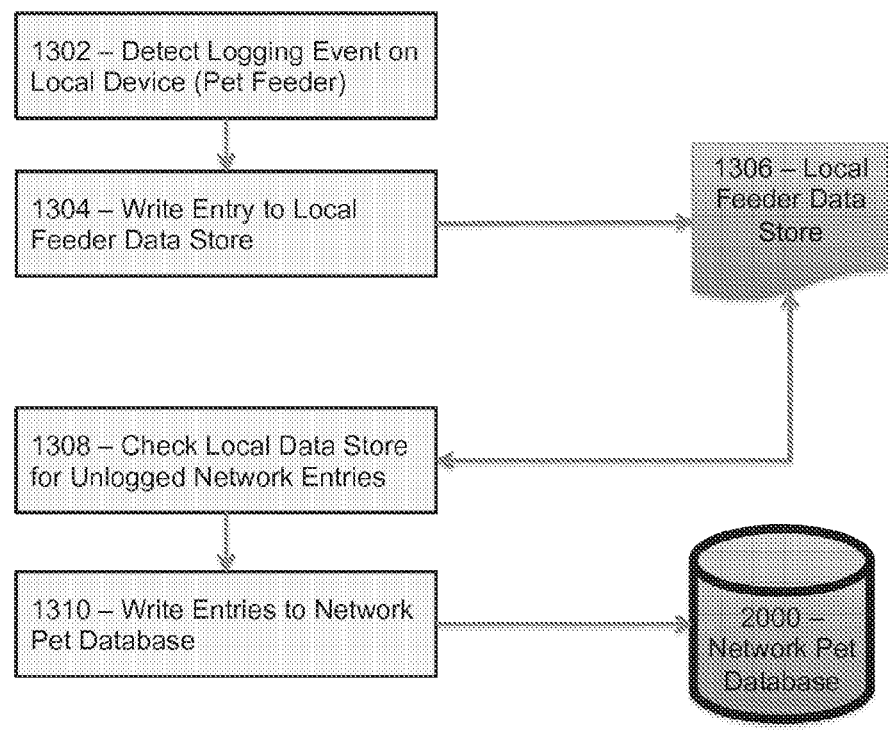
FIG. 13 contains a flowchart of the Log Activity process, according to embodiments of the present disclosure.

FIG. 13 contains a flowchart of the Log Activity 1300 process. The first step in this process is Detect Logging Event on Local Device 1302. This step then calls Write Entry to Local Data Store 1304. This step stores the entry associated with the logging event from step 1302 to the Local Feeder Data Store 1306. The pet feeding device stores activity logs, food type information, food calorie information for the food currently loaded in the bin, and other such data locally to avoid losing data when the network is down. Logging local also keeps the feeder working at optimal speed.

FIG. 13, step 1308 (Check Local Data Store for Unlogged Network Entries) periodically checks the local data store 1306 for unlogged entries. When it finds unlogged entries, it calls Write Entries to Network Pet Database 1310. This step stores the entries in the Network Pet Database 2000.

Figure 14:
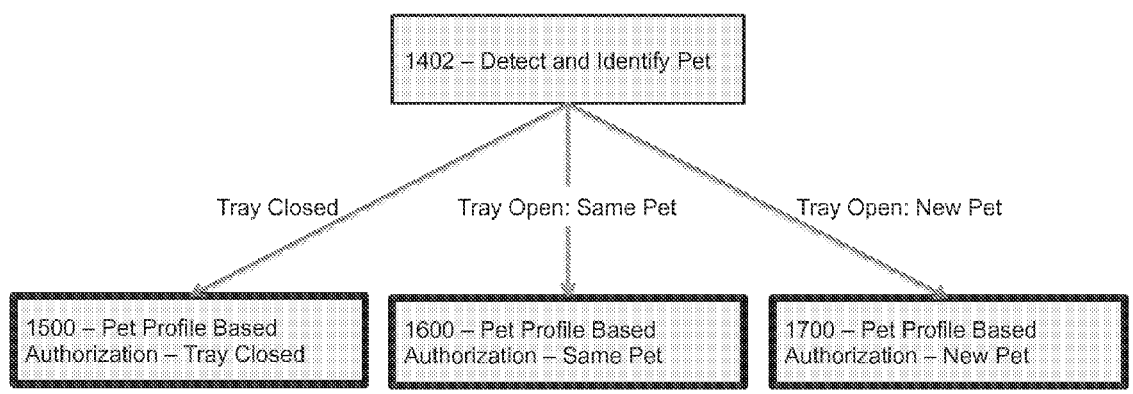
FIG. 14 contains a flowchart of the Pet Profile Based Authorization process, according to embodiments of the present disclosure.

FIG. 14 contains a high level flowchart of the Pet Profile Based Authorization process 1400. The Pet Profile Based Authorization process is an advanced process that can be enabled by a pet owner after the pet owner has setup the profile of each pet. For feeding purposes, the pet profile contains data such as: Feeders Authorized to Pet, Food Types Allowed for Pet, Days/Times Authorized to Feed, Daily Food Allowance, Minimum Time Between Feeding Sessions, and Per Feeding Session Food Allowance. When Pet Profile mode is enabled, there is no longer a schedule for dispensing food. The food bowl is always replenished and kept fully stocked, but the system determines (based on the profile) whether to make food available (and for how long) when a pet approaches to feed. The Pet Profile is evaluated when a pet is detected at the feeder to determine whether to make food available. This high level diagram will call one of three sub-processes (FIG. 15, 16, or 17) based on the current state when a pet is detected. Those states are: "Tray Closed" 1500, "Tray Open: Same Pet" 1600, "Tray Open: New Pet" 1700.

Figure 15:
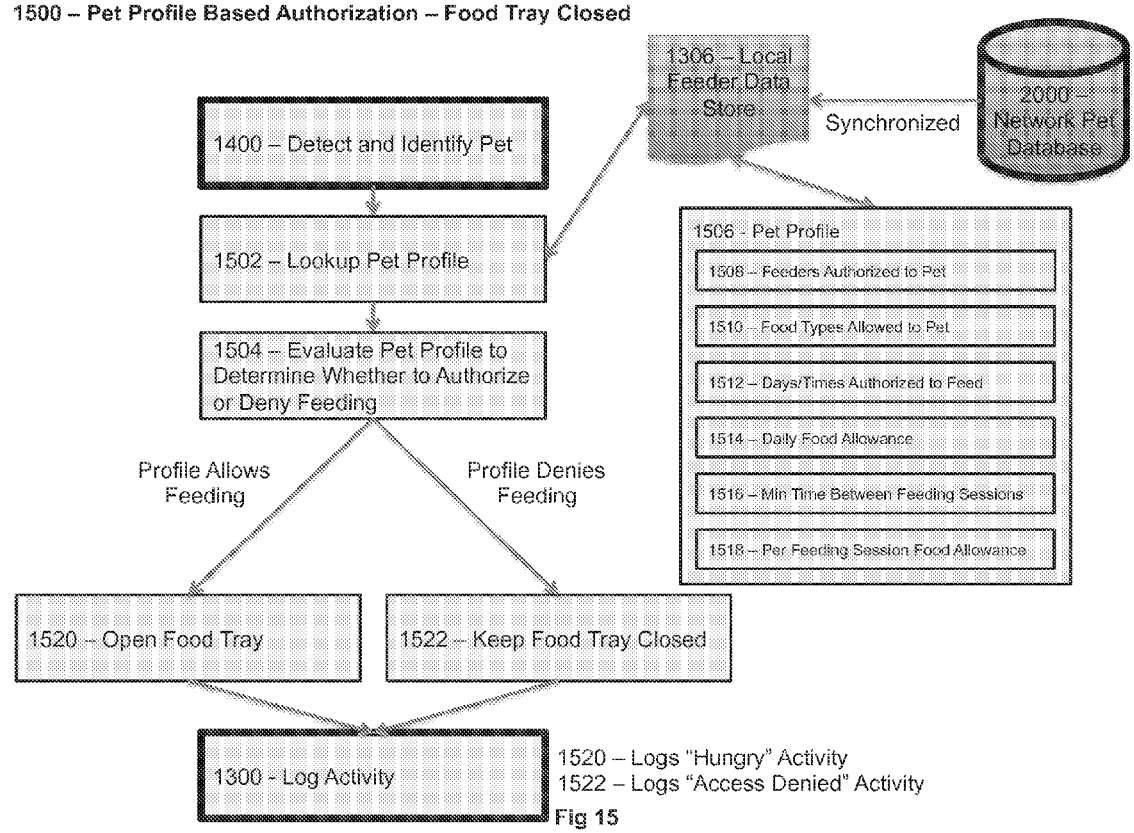
FIG. 15 contains a flowchart of the Pet Profile Based Authorization—Food Tray Closed process, according to embodiments of the present disclosure.

FIG. 15 contains a flowchart of the Pet Profile Based Authorization—Food Tray Closed process 1500. This process is followed when the pet identity reader (FIG. 2a, 206) at the feeder detects a pet while the food tray is closed. Once a pet is identified, step 1502 does a lookup from the Local Feeder Data Store 1306 to retrieve all pet profile data 1506 for the identified pet and data regarding the food type and calorie content currently within the feeder. This data is periodically refreshed from the Network Pet Database 2000 based on changes made by a pet owner via a mobile or desktop application. All of the pet profile data (Feeders Authorized to Pet 1508, Food Types Allowed to Pet 1510, Days/Times Authorized to Feed 1512, Daily Food Allowance 1514, Min Time Between Feeding Sessions 1516, Per Feeding Session Food Allowance 1518) is evaluated to determine whether food will be made available to the pet via the feeder. Step 1504 does this evaluation. The first thing checked in the profile is whether the pet is authorized to the feeder 1508. If the pet is authorized, the food type in the feeder is evaluated against the food allowed for the pet 1510. If the food type is a match, then days/times authorized to feed 1512 is checked, daily food allowance 1514 is checked against the amount eaten so far by the pet (which may be determined by reference to food type calorie content stored by the feeder), and minimum time between feeding sessions 1516 is checked. If any of these checks fails, the pet is not allowed to feed. If all pass then the pet is allowed to feed. If the result is to allow feeding then the food tray is opened 1520. If the result is to deny feeding then the food tray remains closed 1522. In either case, a log entry is made in the Activity Log via step 1300. If the pet is allowed to feed, then during the feeding session the per feeding session food allowance 1518 is regularly being monitored. If this threshold is met during the feeding session, then the food becomes inaccessible to the pet (food tray is closed).

Figure 16:
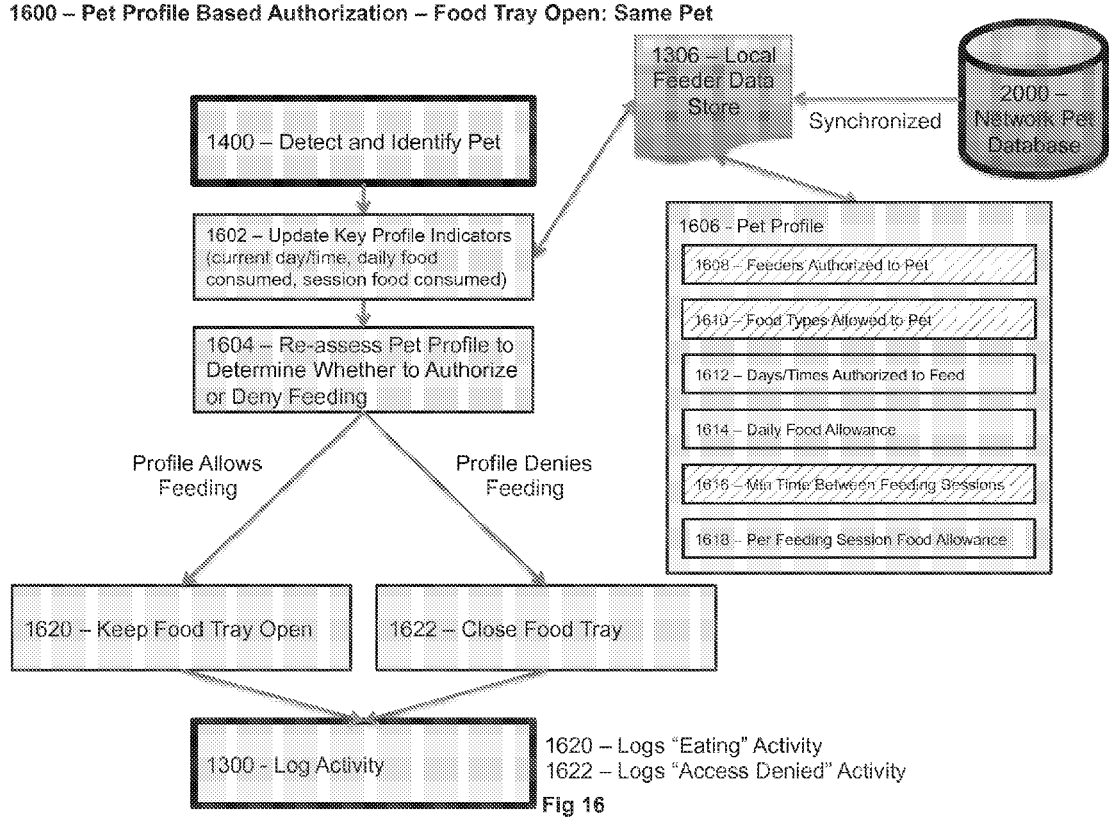
FIG. 16 contains a flowchart of the Pet Profile Based Authorization—Food Tray Open: Same Pet process, according to embodiments of the present disclosure.

FIG. 16 contains a flowchart of the Pet Profile Based Authorization—Food Tray Open: Same Pet process 1600. This process is followed when the pet identity reader (FIG. 2a, 206) at the feeder detects a pet while the food tray is open and the pet is the same pet currently feeding at feeder. When a pet remains at the feeder feeding, some of the Pet Profile indicators (amount of food consumed today, amount of food consumed during this feeding session, etc.) are updated via step 1602. This data is updated in the Local Feeder Data Store 1306. This data is periodically synchronized with the Network Pet Database 2000. Step 1604 then re-assesses the pet profile to determine whether the pet will be allowed to continue feeding or be denied and have the food taken away. If the result is to allow feeding to continue then the food tray is kept open 1620. If the result is to deny feeding then the food tray is closed 1622. The pet will always be allowed to continue feeding unless the threshold value of one of the profile indicators is reached. Examples of this are when the time of feeding moves into an unauthorized feeding time (Days/Times Authorized to Feed 1512) during the feeding session, the daily food allowance (Daily Food Allowance 1514) is exceeded during the feeding session, or the per feeding session allowance (Per Feeding Session Food Allowance 1518) is exceeded during the feeding session. In all cases, a log entry is made in the Activity Log via step 1300.

Figure 17:
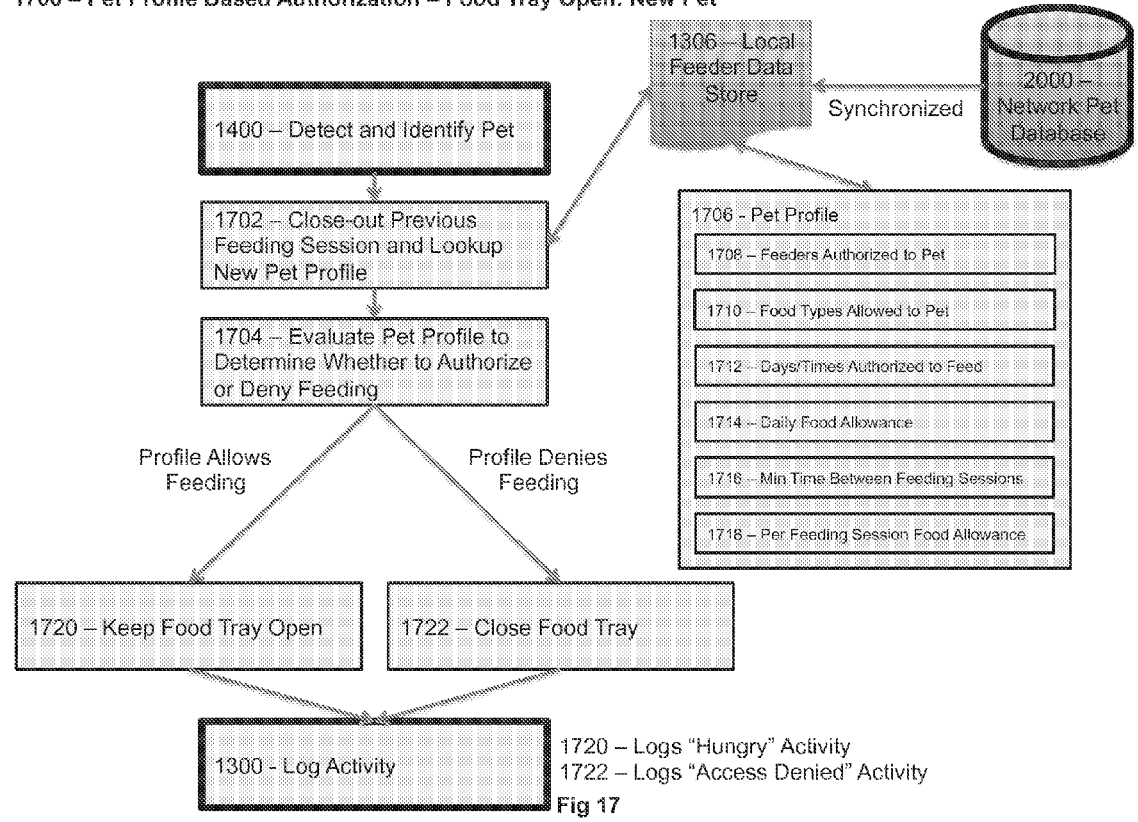
FIG. 17 contains a flowchart of the Pet Profile Based Authorization—Food Tray Open: New Pet process, according to embodiments of the present disclosure.

FIG. 17 contains a flowchart of the Pet Profile Based Authorization—Food Tray Open: New Pet process 1700. This process is followed when the pet identity reader (FIG. 2a, 206) at the feeder detects a pet while the food tray is open and the pet is not the pet that caused the food tray to open. Step 1702 is invoked when the new pet arrives at the feeder, causing the current feeding session to be closed out, written to the database, and the profile of the new pet is retrieved from the Local Feeder Data Store 1306. All of the new pet profile data (Feeders Authorized to Pet 1708, Food Types Allowed to Pet 1710, Days/Times Authorized to Feed 1712, Daily Food Allowance 1714, Min Time Between Feeding Sessions 1716, Per Feeding Session Food Allowance 1718) is evaluated to determine whether food will be kept available for the new pet. Step 1704 does this evaluation. The first thing checked in the profile is whether the pet is authorized to the feeder 1708. If the pet is authorized, the food type in the feeder is evaluated against the food allowed for the pet 1710. If the food type is a match, then days/times authorized to feed 1712 is checked, daily food allowance 1714 is checked against the amount eaten so far by the pet, and minimum time between feeding sessions 1716 is checked. If any of these checks fails, the pet is not allowed to feed. If all pass then the pet is allowed to feed. If the result is to allow feeding then the food tray is opened 1720. If the result is to deny feeding then the food tray remains closed 1722. In either case, a log entry is made in the Activity Log via step 1300. If the pet is allowed to feed, then during the feeding session the per feeding session food allowance 1718 is regularly being monitored. If this threshold is met during the feeding session, then the food becomes inaccessible to the pet (food tray is closed).

Figure 18:
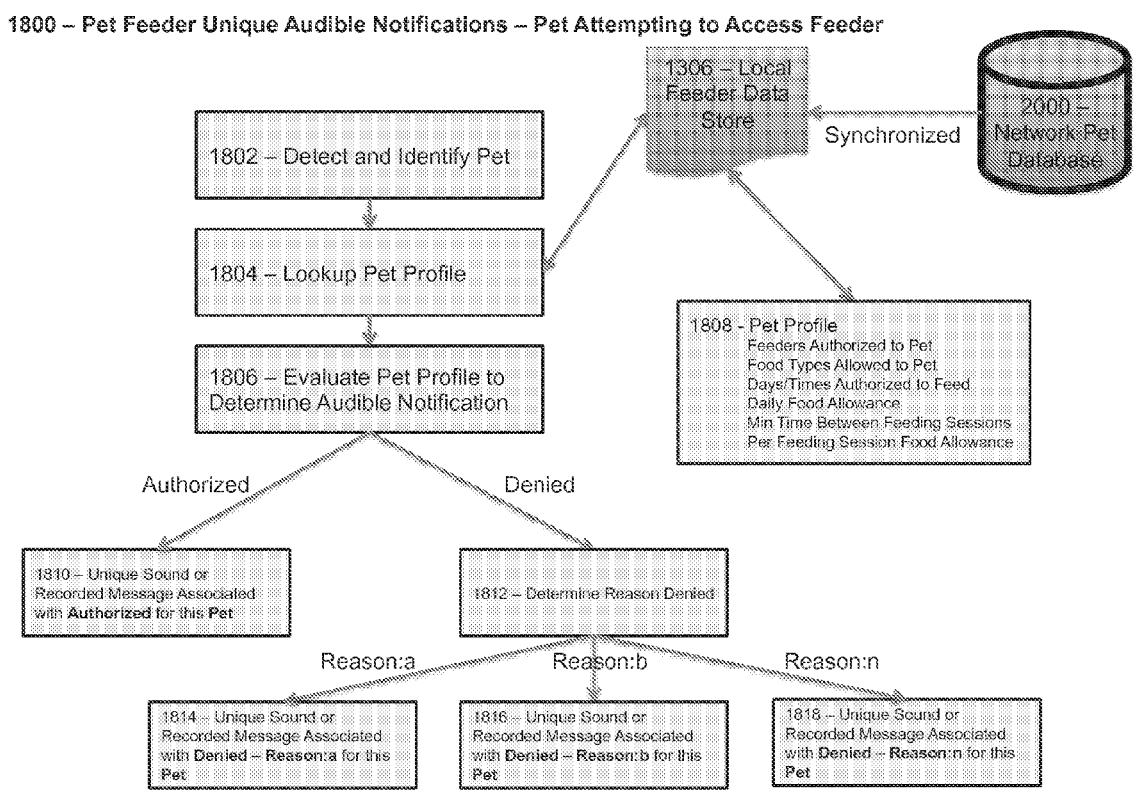
FIG. 18 contains a flowchart of the Pet Feeder Unique Audible Notifications—Pet Attempting to Access Feeder process, according to embodiments of the present disclosure.

FIG. 18 contains a flowchart of the Pet Feeder Unique Audible Notifications—Pet Attempting to Access Feeder process 1800. This process is followed when the pet identity reader (FIG. 2a, 206) at the feeder detects a pet 1802. The feeder software will lookup 1804 the pet profile 1808 and evaluate 1806 to determine the appropriate audible notification. The audible notifications are associated specifically to the identified pet and determined based on whether the pet is authorized or denied feeding at that specific time. If the pet is authorized 1810 a unique audible sound or recorded message will be emitted by the feeder that may be unique for the identified pet. If the pet is denied, the reason for denial will be determined 1812 and unique sounds or recorded messages (associated with the denial reason and identified pet) will be emitted by the feeder (Unique Sound or Recorded Messages Associate with Denied—Reason a: for this pet 1814, Unique Sound or Recorded Messages Associate with Denied—Reason b: for this pet 1816, Unique Sound or Recorded Messages Associate with Denied—Reason n: for this pet 1818). The purpose of the audible sounds and recorded messages are to train the pet on when it is appropriate to feed and when it is not. The use of unique sounds per type of activity (authorized or denied) and per pet will help to encourage healthy eating behavior.

Figure 19:
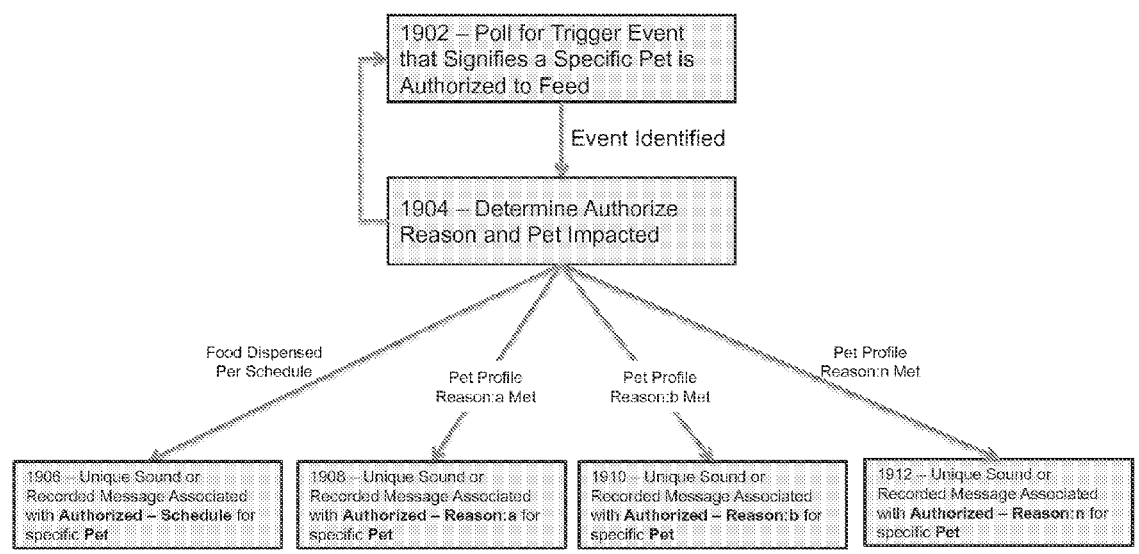
FIG. 19 contains a flowchart of the Pet Feeder Unique Audible Notifications—Criteria Met to Allow a Specific Pet to Feed process, according to embodiments of the present disclosure.

FIG. 19 contains a flowchart of the Pet Feeder Unique Audible Notifications—Criteria Met to Allow a Specific Pet to Feed process 1900. This process is followed when a trigger event occurs that signifies a specific pet may come to the feeder to feed 1902. Examples of trigger events include: a) food dispensed to bowl based on pre-set schedule (e.g., feeding time); b) a pet profile threshold achieved (e.g., min time between feeding sessions exceeded for pet 'z'). If a trigger event is identified, the authorize reason will be determined along with the impacted pet 1904 so that a unique sound or recorded message may be emitted. If the authorize reason is due to food being dispensed per a pre-set schedule, then a unique sound or recorded message for the specific pet impacted will be emitted 1906. If the authorize reason is due to criteria identified in the pet profile, then a unique sound or recorded message for that specific pet profile reason for the specific pet impacted will be emitted (Unique Sound or Recorded Messages Associate with Authorized—Reason a: for this pet 1908, Unique Sound or Recorded Messages Associate with Authorized—Reason b: for this pet 1910, Unique Sound or Recorded Messages Associate with Authorized—Reason n: for this pet 1912).

Figure 20:
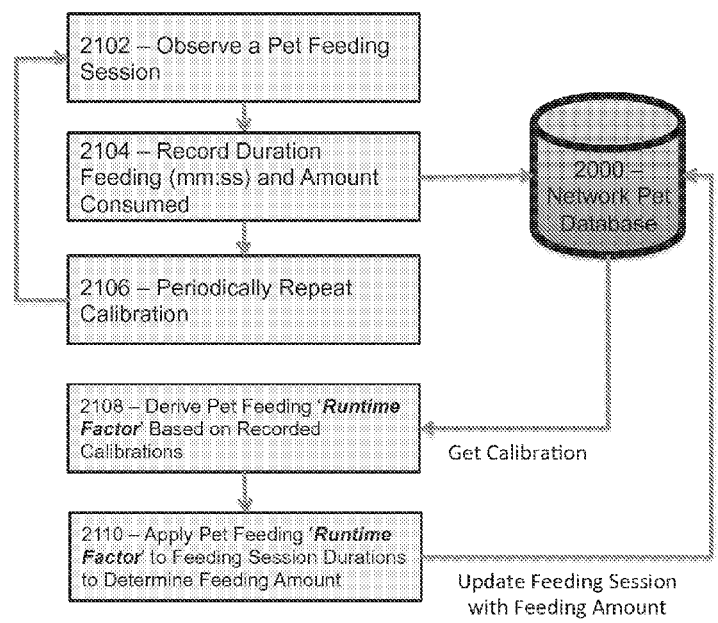
FIG. 20 contains a flowchart of the Derive Pet Feeding Runtime and Use to Determine Amount Consumed by Pet in Feeding Session process, according to embodiments of the present disclosure.

FIG. 20 contains a flowchart of the Derive Pet Feeding Runtime and Use to Determine Amount Consumed by Pet in Feeding Session process 2100. This process is used to calibrate a Pet Feeding Runtime (associated with a specific pet) so that the amount consumed by a specific pet within a specific time period can be estimated. The amount of food consumed per feeding session (and in aggregate daily) is a key piece of information that an owner will look at to determine how their pet(s) are consuming food. The data is available via the mobile and desktop applications. The first step in this process is for a pet owner to observe a pet feeding session 2102. There are 2 variables that need to be recorded (2104). First, the feeding time of the session (in minutes and seconds). Second, the amount of food consumed during the session (e.g., how many cups of food or how many calories of food). These 2 variables are stored in the Network Pet Database 2000 and used to determine how much food is consumed during a given feeding duration. Step 2106 enables the calibration to be periodically refined by repeating the observation 2102 and recording 2104 steps. Step 2108 calculates the pet Runtime Factor. The pet Runtime Factor equals the amount of food consumed divided by the time it took to consume the food or Amount/Time. For example, if the calibration recorded 2 cups of food consumed in 10 minutes, then the pet Runtime Factor would equal 1 cup per every 5 minutes of eating or $\frac{1}{5}^{th}$. If the pet with this Runtime Factor was monitored eating for 2.5 minutes, then 2.5 would be multiplied by $\frac{1}{5}^{th}$ to determine the amount of food eaten or ½ cup of food. Step 2110 uses the Runtime Factor to update a feeding session with the estimated feeding amount in the Network Pet Database 2000.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor can receive instructions and data from a read only memory or a random access memory or both. The essential elements of a computer are a processor for executing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A pet feeding apparatus comprising:
   a single-entry feeding zone comprising a feeding bowl, an access control system which changes the feeding bowl between an accessible state and an inaccessible state, and blocking walls which prevent access to the feeding bowl from all but one access position when the feeding bowl is in an accessible state, wherein the access control system comprises a moving drawer configured to move the feeding bowl out of and to retract the feeding bowl into an enclosure, corresponding to the accessible and inaccessible states;

a food storage bin;

a sensor, wherein the sensor detects a presence and an identity of a pet;

a memory storage, wherein the memory storage is configured to store food calorie content information for a food contained in the food storage bin and at least one animal profile comprising pet identity data and pet feeding data; and at least one processor, wherein the processor is configured to change the feeding bowl into an accessible state via the access mechanism based on the food calorie content information and the pet feeding data in an identified animal profile, wherein the identified animal profile is an animal profile with pet identity data corresponding to the pet identity detected by the sensor.

2. The pet feeding apparatus of claim 1, wherein the sensor comprises a radio-based tag sensor.

3. The pet feeding apparatus of claim 2, wherein the sensor further comprises a motion sensor.

4. The pet feeding apparatus of claim 1, further comprising a network interface for sending and receiving one or more of pet feeding data, pet identity data, and at least one of the at least one animal profiles.

5. The apparatus of claim 4, wherein the processor is further configured to modify at least one of the at least one animal profiles based on data received via the network interface.

6. The apparatus of claim 1, further comprising a food dispenser that is configured to dispense a controlled amount of food in response to a command from the processor.

7. The apparatus of claim 1, further comprising a food consumption measurement sensor that is configured to determine an amount of food consumed by the pet.

8. The apparatus of claim 7, further comprising a network interface for sending and receiving pet feeding data, wherein the processor is further configured to transmit pet feeding data via the network interface in response to detecting that the pet has consumed food.

9. The apparatus of claim 7, wherein the food consumption measurement sensor is a scale.

\* \* \* \* \*